United States Patent
Chen et al.

(10) Patent No.: US 11,621,108 B2
(45) Date of Patent: Apr. 4, 2023

(54) PPTC TANK HEATER

(71) Applicant: Littelfuse, Inc., Chicago, IL (US)

(72) Inventors: Jianhua Chen, Chicago, IL (US);
Davide Faganello, Chicago, IL (US)

(73) Assignee: Littelfuse, Inc., Chicago, IL (US)

(*) Notice: Subject to any disclaimer, the term of this patent is extended or adjusted under 35 U.S.C. 154(b) by 0 days.

(21) Appl. No.: 17/383,513

(22) Filed: Jul. 23, 2021

(65) Prior Publication Data

US 2022/0208420 A1 Jun. 30, 2022

Related U.S. Application Data

(63) Continuation of application No. 17/176,649, filed on Feb. 16, 2021, now Pat. No. 11,488,749.

(30) Foreign Application Priority Data

Dec. 28, 2020 (WO) ................ PCT/CN2020/140264

(51) Int. Cl.
H01C 7/02 (2006.01)
H01C 1/14 (2006.01)
H01B 1/04 (2006.01)
H01C 17/065 (2006.01)

(52) U.S. Cl.
CPC ............... H01C 7/027 (2013.01); H01B 1/04 (2013.01); H01C 1/1406 (2013.01); H01C 17/06586 (2013.01)

(58) Field of Classification Search
CPC ............. H01C 7/027; H01C 1/1406; H01C 17/06586; H01B 1/04
USPC ........................................ 338/22 R
See application file for complete search history.

(56) References Cited

U.S. PATENT DOCUMENTS

| 5,471,034 | A | 11/1995 | Kawate |
| 6,492,629 | B1 | 12/2002 | Sopory |
| 2011/0062145 | A1 | 3/2011 | Yang |
| 2014/0050465 | A1 | 2/2014 | Kominami |
| 2018/0012686 | A1* | 1/2018 | Golubovic ......... H01C 17/0652 |
| 2018/0261362 | A1 | 9/2018 | Hu |
| 2019/0080824 | A1 | 3/2019 | Chen |
| 2019/0096621 | A1* | 3/2019 | Chen ................... C08L 23/16 |

(Continued)

FOREIGN PATENT DOCUMENTS

| CN | 110400892 A | 11/2019 |
| CN | 210579283 U | 5/2020 |

(Continued)

OTHER PUBLICATIONS

International Search Report and Written Opinion dated Oct. 4, 2021 for PCT/CN2020/140264 filed Dec. 28, 2020.

Primary Examiner — Edwin A. Leon
Assistant Examiner — Iman Malakooti
(74) Attorney, Agent, or Firm — KDB Firm PLLC

(57) ABSTRACT

A polymeric positive temperature coefficient (PPTC) tank heater features a first conductive region, a heater body, and a second conductive region, forming a sandwich. The first conductive region includes a first conductive surface connected to a first lead and a second conductive surface connected to a second lead. The heater body is a PPTC polymer matrix including a conductive filler and a semi-crystalline polymer. The sandwich includes multiple heating elements connected in series and each heating element supplies a different resistance.

16 Claims, 19 Drawing Sheets

(56) References Cited

U.S. PATENT DOCUMENTS

2019/0222040 A1    7/2019  Guo
2022/0208420 A1    6/2022  Chen

FOREIGN PATENT DOCUMENTS

| CN | 111628248 A | 9/2020 |
| CN | 211702419 U | 10/2020 |
| CN | 112009694 A | 12/2020 |
| JP | 2019036425 A | 3/2019 |

* cited by examiner

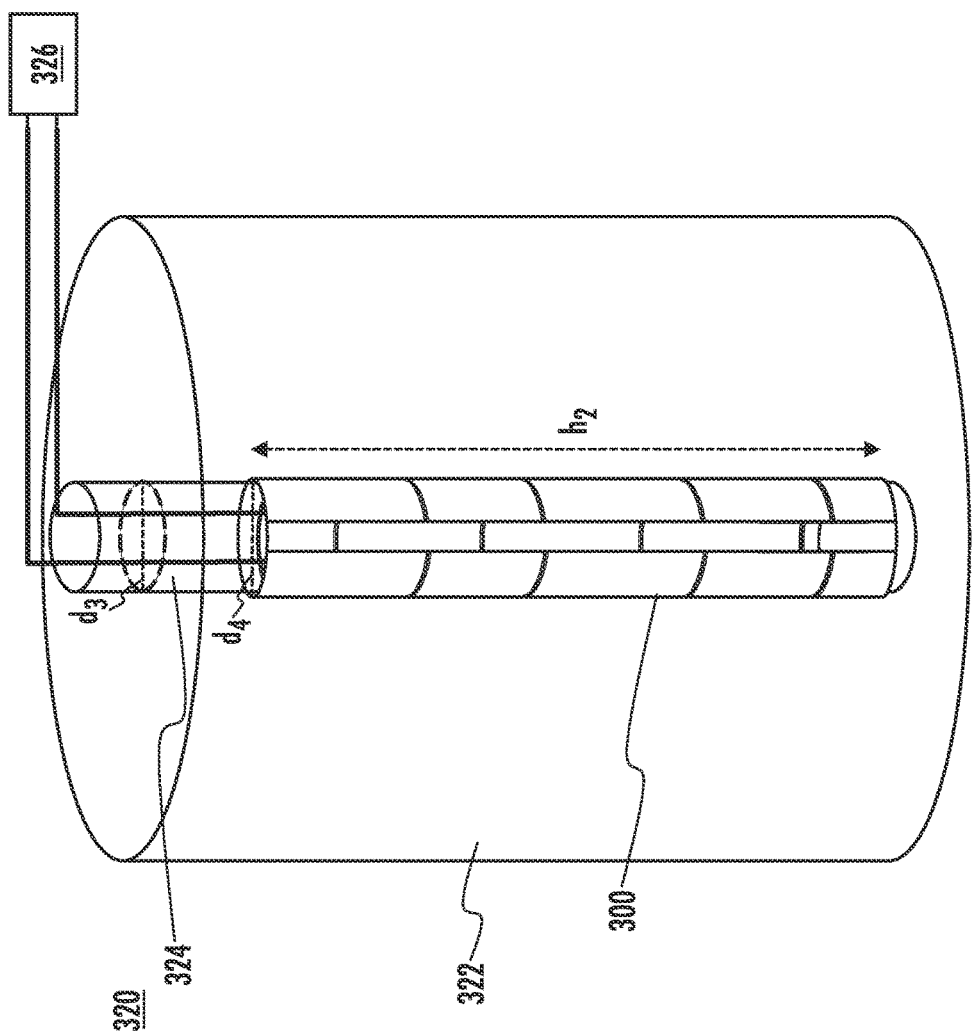
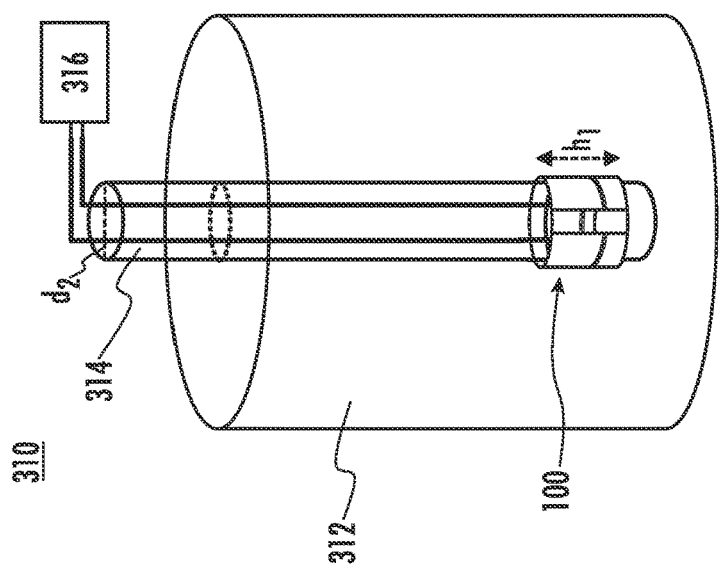
FIG. 3B
FIG. 3A

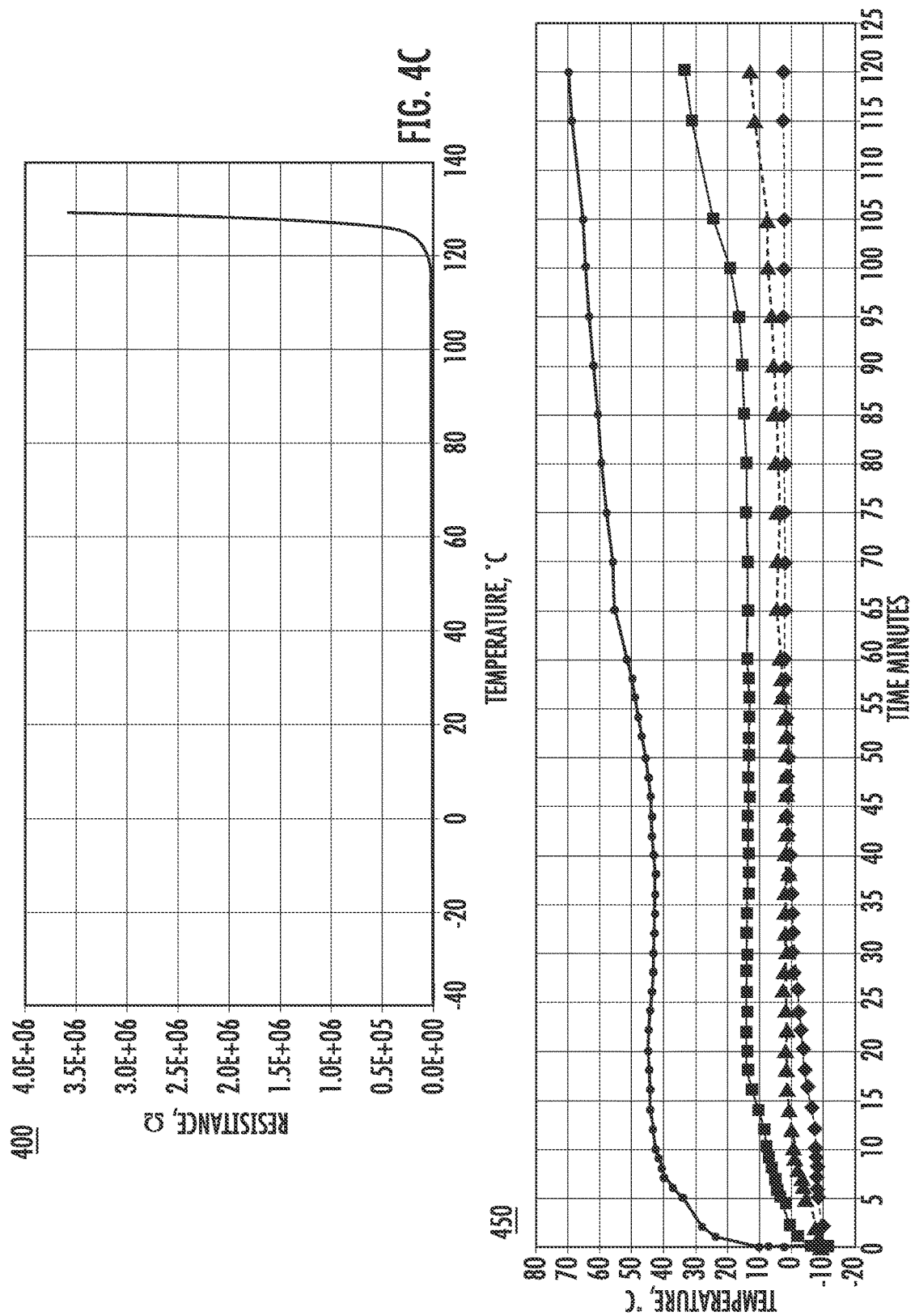

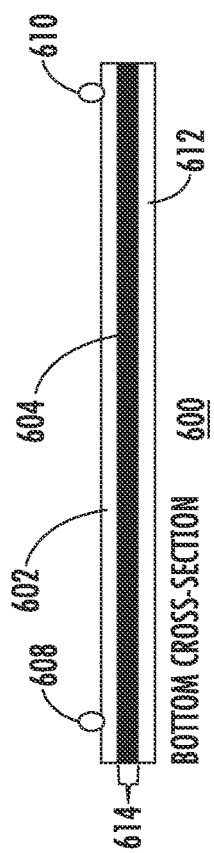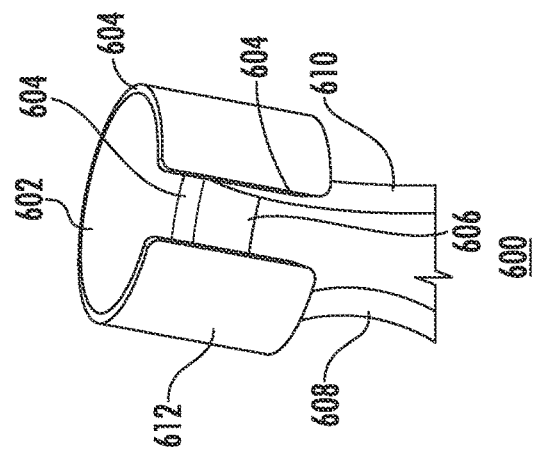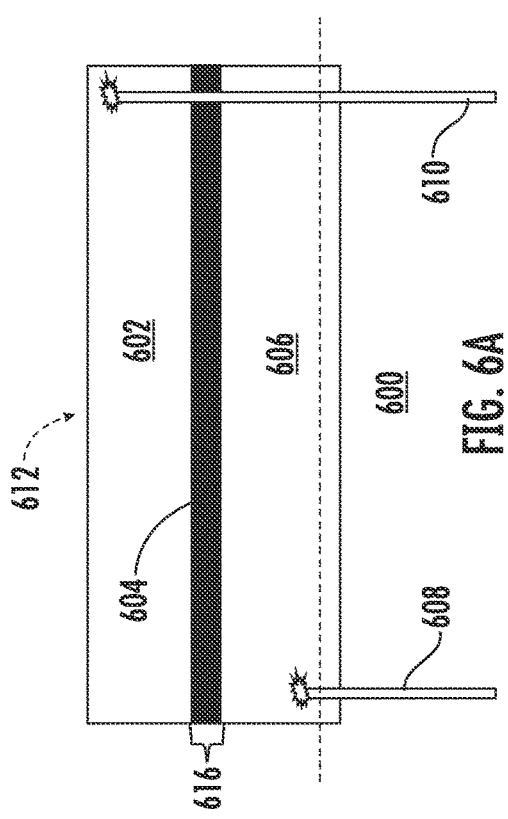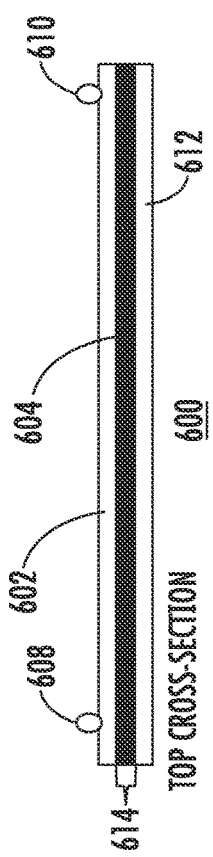
FIG. 6A
FIG. 6B
FIG. 6C
FIG. 6D

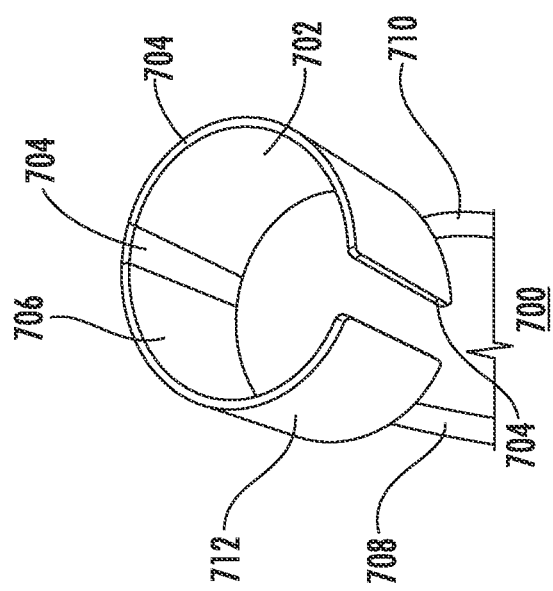
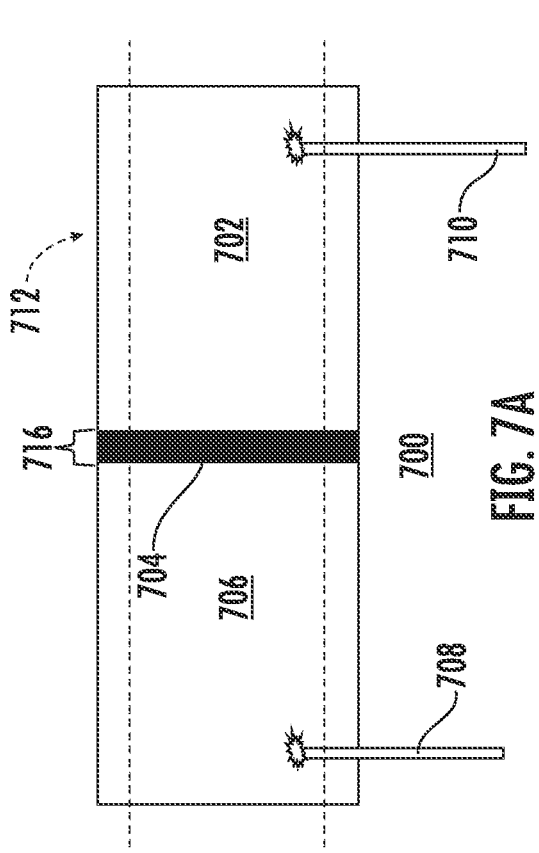
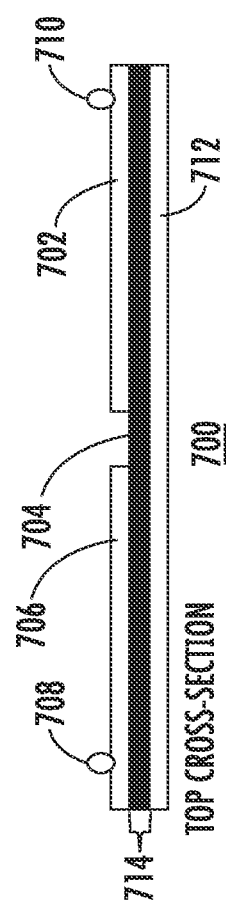

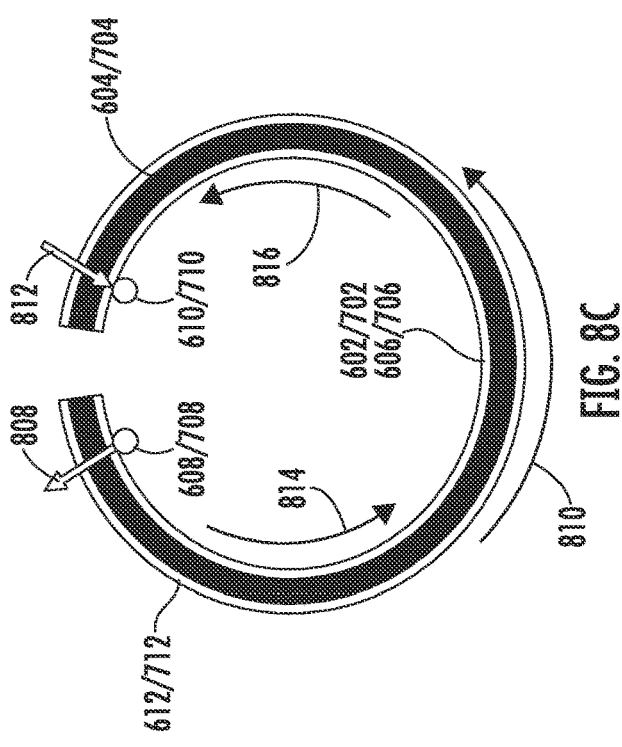
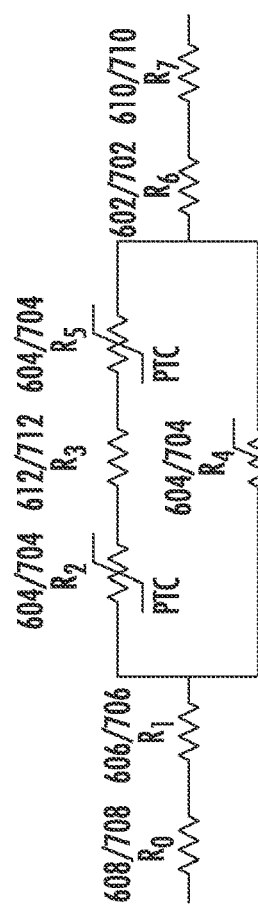
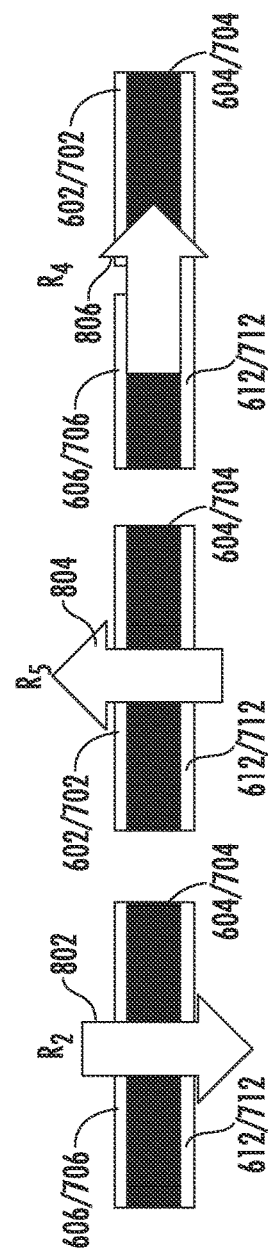
FIG. 8A
FIG. 8B
FIG. 8C

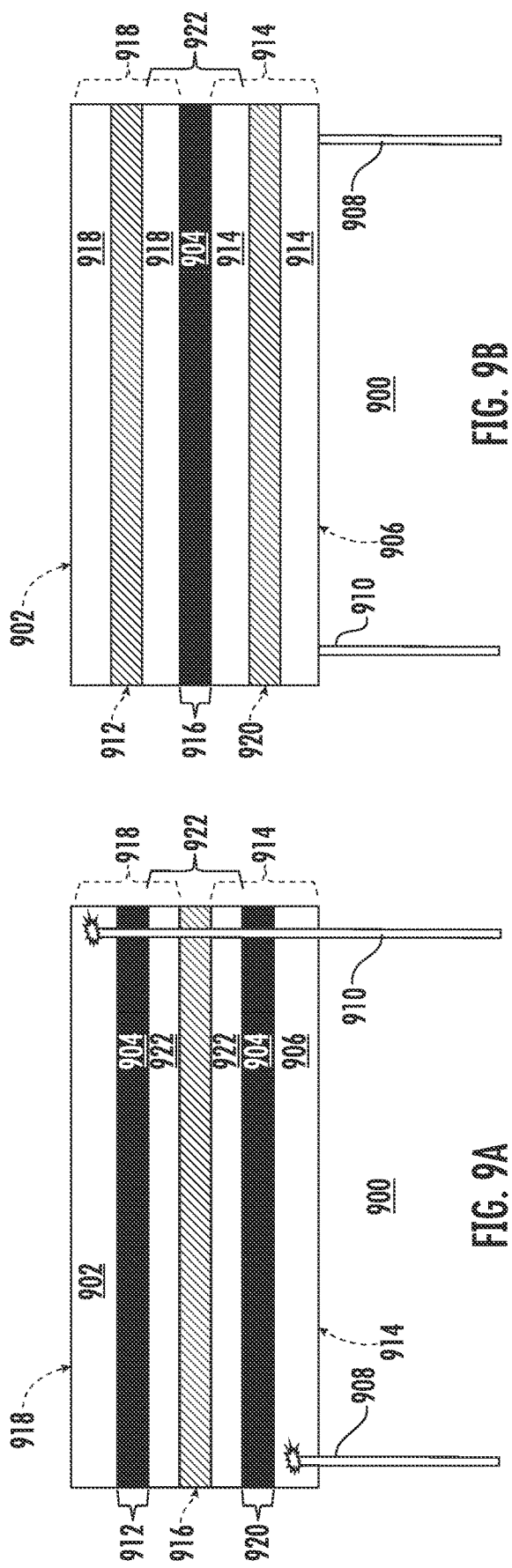
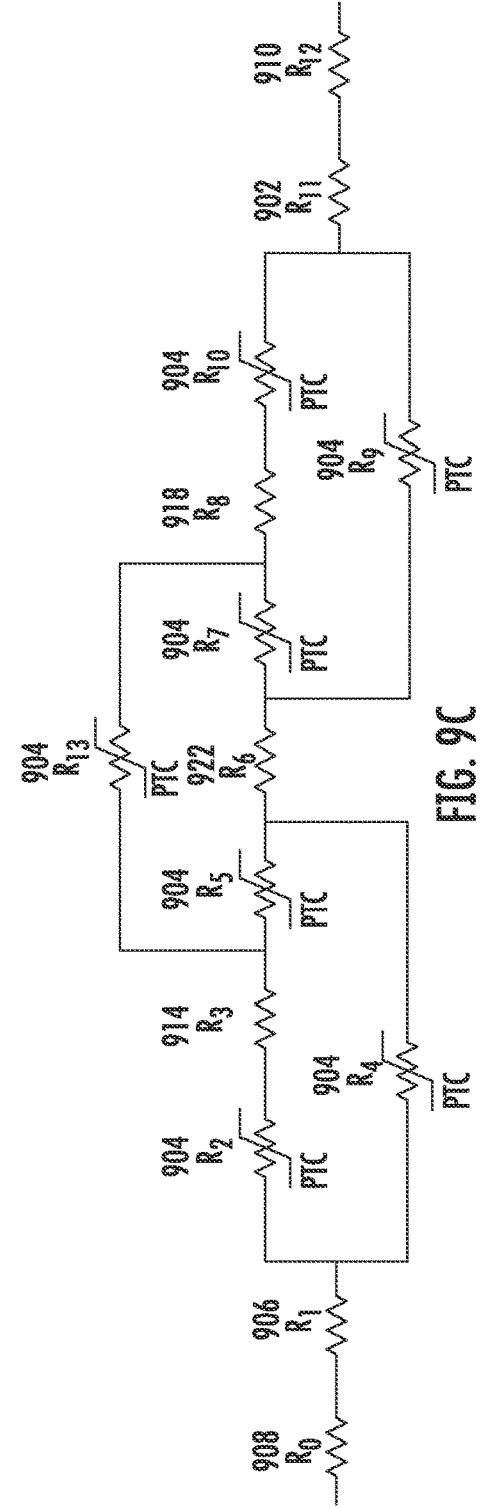

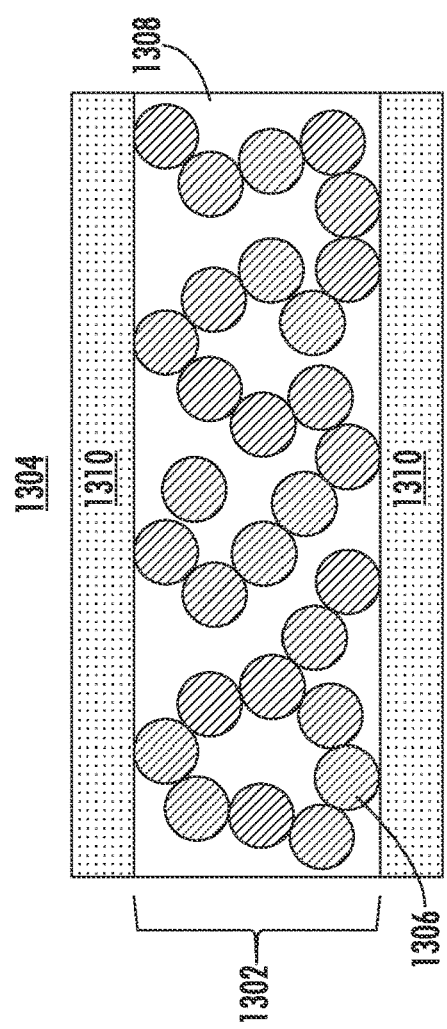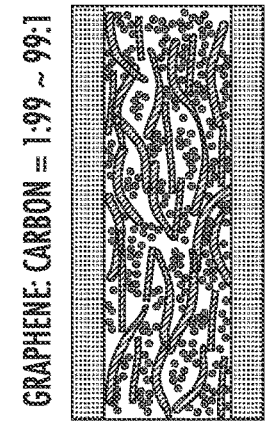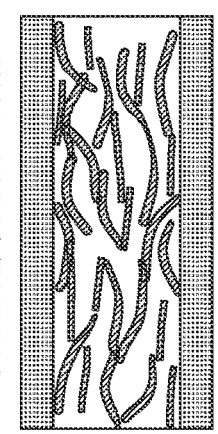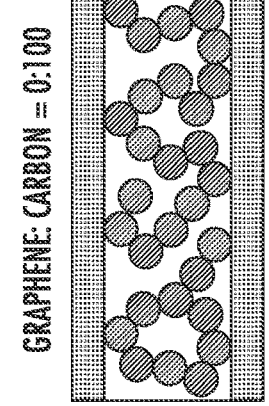

PPTC TANK HEATER

CROSS-REFERENCE TO RELATED APPLICATIONS

This application is a continuation of and claims priority to PCT Application No. PCT/CN2020/140264, filed Dec. 28, 2020, and U.S. patent application Ser. No. 17/176,649, filed Feb. 16, 2021, both of which are incorporated by reference herein in their entirety.

FIELD OF THE DISCLOSURE

Embodiments of the present disclosure relate to PPTC devices and, more particularly, to a PPTC device that heats liquid in a tank.

BACKGROUND

Some vehicles combustion engines include water injection systems. In one implementation, water is injected as a fine spray into the intake manifold plenum chamber where it evaporates, thus lowering the temperature of the intake air. This reduces the final compression temperature in the combustion chamber. Several benefits are derived from this technique, including the reduced risk of knock, increased power and torque, improvement in efficiency, and prolonged engine life.

The water injection system includes a water reservoir, such as a tank, hoses, and pumps for delivering the water to the intake manifold plenum chamber. A supply of water in the tank must be maintained for the water injection system to work. When the vehicle engine is switched off, the water in the hoses may be drained back into the tank, thus protecting the hoses from damage due to freezing water. Further, the water tank may be insulated to avoid freezing of its contents. If the water tank freezes, the water injection system is unable to operate. Thus, the water injection system of the vehicle may not be used in certain climates or during certain times of the year.

Positive temperature coefficient (PTC) and polymer PTC (PPTC) devices are utilized in circuits to disrupt overcurrent and overvoltage conditions that may damage expensive circuitry within an electronic system. The PTCs include material that changes its physical properties when heated up. PTCs increase resistance as temperature increases due to increased current flow. Once the fault condition is removed, the PTC device cools down to its original configuration. The PTC and PPTC are thus thought of as resettable fuses.

PTC technology may be used for heater applications. However, the PTC devices are awkward for some heater applications, due to their size and shape, such that they have a higher power density to be effective in heating applications.

It is with respect to these and other considerations that the present improvements may be useful.

SUMMARY

This Summary is provided to introduce a selection of concepts in a simplified form that are further described below in the Detailed Description. This Summary is not intended to identify key or essential features of the claimed subject matter, nor is it intended as an aid in determining the scope of the claimed subject matter.

An exemplary embodiment of a polymeric positive temperature coefficient (PPTC) tank heater in accordance with the present disclosure may include a first conductive region having a first conductive surface connected to a first lead (wire) and a second conductive surface connected to a second lead, a heater body having a PPTC polymer matrix, the PPTC polymer matrix being a conductive filler and a semi-crystalline polymer, and a second conductive region, with the heater body being between the first conductive region and the second conductive region, forming a sandwich. The sandwich includes multiple heating elements connected in series and each heating element supplies a different resistance.

Another exemplary embodiment of a PPTC tank heater in accordance with the present disclosure may include a heater body and four heating elements connected in series. The heater body includes a PPTC polymer matrix, the PPTC polymer matrix including a conductive filler and a semi-crystalline polymer. The first heating element includes the heater body disposed between a first conductive surface and a second conductive surface, the first conductive surface being connected to a first lead. The second heating element includes the heater body disposed between the second conductive surface and a third conductive surface. The third heating element includes the heater body disposed between the third conductive surface and a fourth conductive surface. The fourth heating element includes the heater body disposed between the fourth conductive surface and a fifth conductive surface, which is connected to a second lead.

An exemplary embodiment of a PPTC tank heater in accordance with the present disclosure may include a heater body and two conductive regions. The heater body includes a PPTC polymer matrix made up of a conductive filler and a semi-crystalline polymer. The first conductive region consists of N conductive surfaces and N−1 slots, for integer N. The second conductive region consists of M conductive surfaces and M−1 slots, for integer M, each of the N conductive surfaces and the M conductive surfaces having the same width and thickness but different height, wherein the heater body is sandwiched between the first conductive surface and the second conductive surface. Based on this configuration, multiple heating elements are formed, with each heating element having one conductive surface from the N conductive surfaces and a second conductive surface from the M conductive surfaces, with the heater body being sandwiched between the two conductive surfaces.

BRIEF DESCRIPTION OF THE DRAWINGS

FIGS. 3A-3B are diagrams illustrating a tank utilizing the PPTC tank heater of FIGS. 1A-1D, in accordance with exemplary embodiments;

FIGS. 4A-4D are diagrams illustrating a test performed on an annular PPTC tank heater, in accordance with exemplary embodiments;

FIGS. 6A-6D are diagrams illustrating an annular PPTC tank heater, in accordance with exemplary embodiments;

FIGS. 7A-7C are diagrams illustrating an annular PPTC tank heater, in accordance with exemplary embodiments;

FIGS. 8A-8C are diagrams illustrating properties of the annular PPTC tank heaters of FIGS. 6A-6D and 7A-7C, in accordance with exemplary embodiments;

FIGS. 9A-9C are diagrams illustrating a PPTC tank heater, in accordance with exemplary embodiments;

FIGS. 13A-13D are diagrams of a heater body for any of the disclosed PPTC tank heaters, in accordance with exemplary embodiments;

DETAILED DESCRIPTION

In accordance with the embodiments described herein, a novel tank heater is disclosed for a water injection system. The annular tank heater is a polymeric positive temperature coefficient (PPTC) device consisting of conductive filler and semi-crystalline polymer. The conductive filler may be a carbon/graphene combination, as one example, but the PPTC tank heater may be made from a variety of conductive fillers. The PPTC tank heater may be annular or flat in shape. A series of distinct heating elements, each supplying a controlled amount of heat to respective testing points of the receiving structure makes the PPTC tank heater self-balancing. The PPTC tank heater is also self-limiting, as its temperature does not exceed a predetermined ceiling. Physical characteristics of the PPTC tank heater, such as number, width, and orientation of slots, number and dimension of conductive surfaces, composition and dimension of heater body, location of leads, height, thickness, and diameter of the annular or flat structure, enable the current flow and the temperature to be strategically controlled.

For the sake of convenience and clarity, terms such as "top", "bottom", "upper", "lower", "vertical", "horizontal", "lateral", "transverse", "radial", "inner", "outer", "left", and "right" may be used herein to describe the relative placement and orientation of the features and components of the electrical box, each with respect to the geometry and orientation of other features and components of the electrical box appearing in the perspective, exploded perspective, and cross-sectional views provided herein. Said terminology is not intended to be limiting and includes the words specifically mentioned, derivatives therein, and words of similar import.

PPTC Tank Heater

Figure 1C:
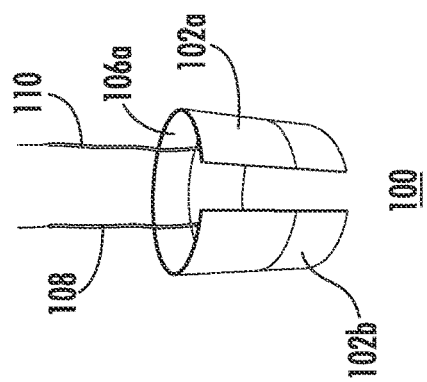
FIGS. 1A-1D are diagrams illustrating a PPTC tank heater, in accordance with exemplary embodiments.
Figure 1B:
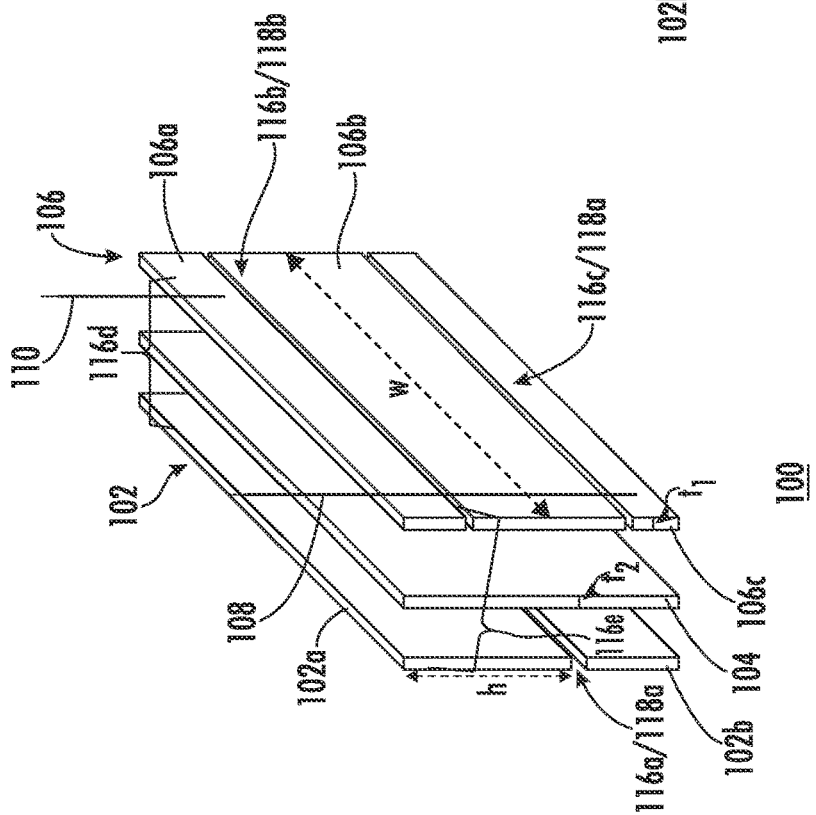
Figure 1A:
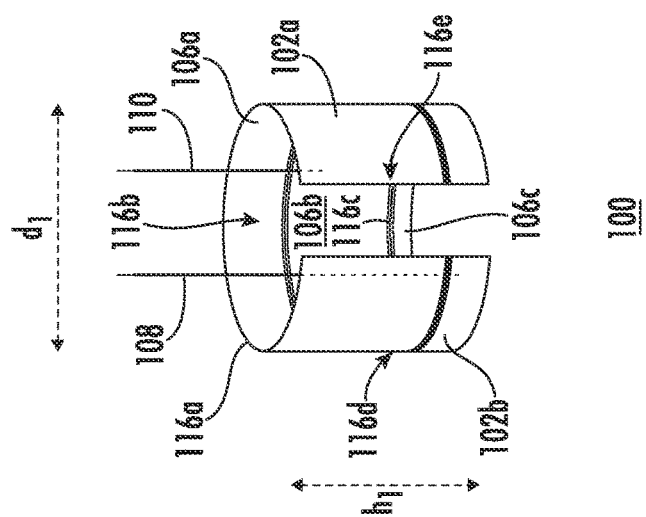
Figure 1D:
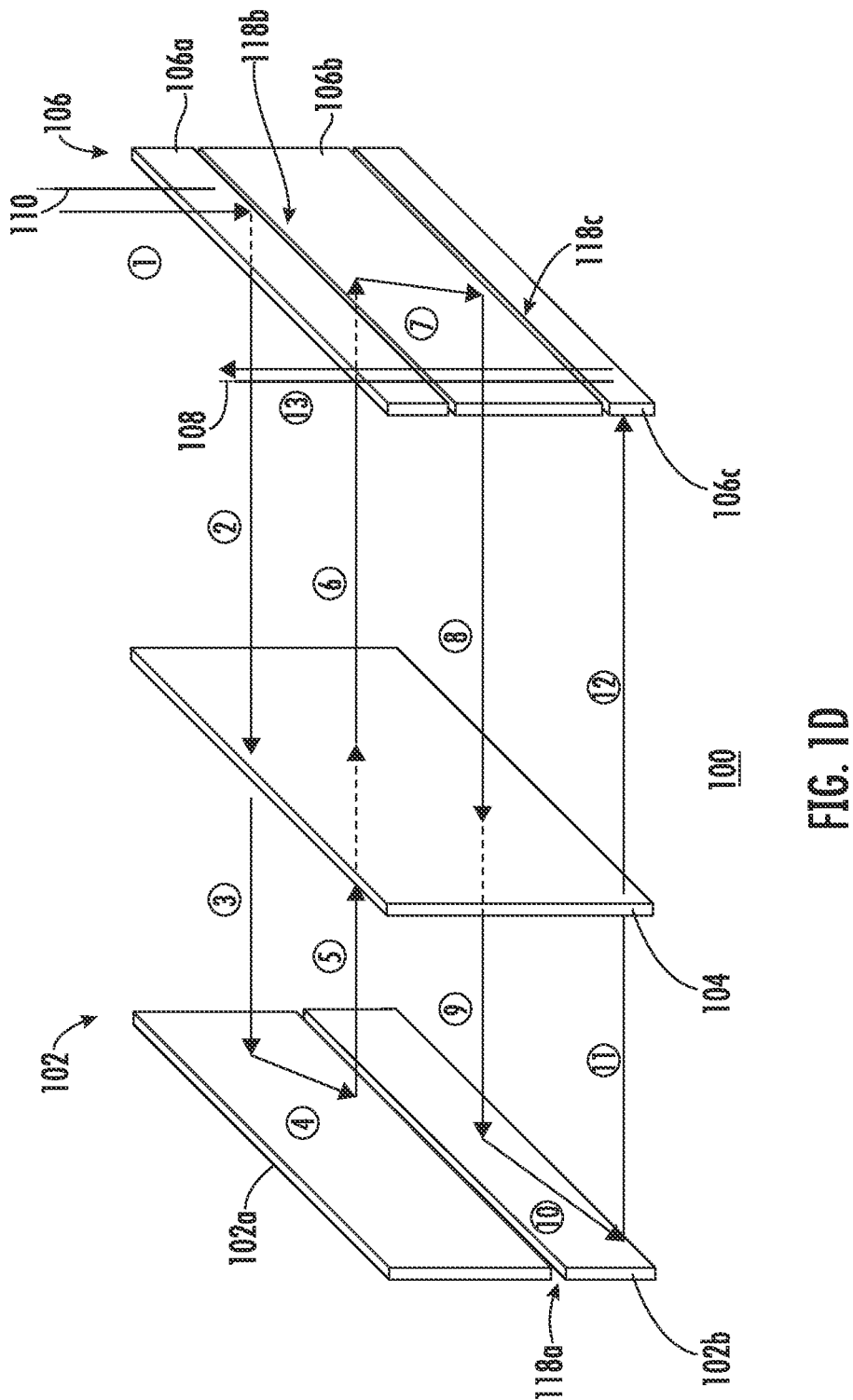

FIGS. 1A-1D are representative drawings of a novel PPTC tank heater, according to exemplary embodiments. FIG. 1A is a perspective view of the PPTC tank heater in an annular (ring-shaped) configuration; FIG. 1B is a perspective view of the PPTC tank heater in a sandwich configuration, before becoming an annular shape; FIG. 1C is a photographic image of the PPTC tank heater in the annular configuration; and FIG. 1D is an exploded perspective view of the PPTC tank heater in the sandwich configuration. The polymeric positive temperature coefficient (PPTC) tank heater 100 includes a heater body 104 consisting of a PTC material. The heater body is disposed between two conductive regions 102 and 106 as a "sandwich". The conductive regions 102 and 106 are opposing surfaces which may each include zero or more slots 118 and gaps 116 through which the heater body 104 is visible. The PPTC tank heater 100 is one of several embodiments of annular PPTC tank heaters illustrated and described herein.

In the sandwich configurations (FIGS. 1B and 1D), the distances between the heater body 104 and the two conductive regions 102 and 106 are exaggerated. In exemplary embodiments, the conductive region 102 (to the left of heater body 104) consists of two conductive surfaces 102a and 102b. The conductive region 106 (to the right of heater body 104) consists of three conductive surfaces, 106a, 106b, and 106c. In the annular configuration (FIG. 1A), the conductive region 102 may be thought of as the outside portion and the conductive region 106 may be thought of as the inside portion of the PPTC tank heater 100.

A lead (wire) 108 is connected to conductive surface 106c while a lead (wire) 110 is connected to the conductive surface 106a. Because they are partially obscured, dotted lines are used to indicate connection points of the leads 108 and 110 to the inside (not visible) surfaces of conductive surfaces 106c and 106a, respectively. Conductive surfaces 106c and 106a may also be thought of as electrodes, since they connect to the leads 108 and 110, respectively, whereas conductive surfaces 106b, 102a, and 102b are not technically electrodes. In exemplary embodiments, the conductive surfaces 102a, 102b, 106a, 106b, and 106c are made from the same conductive material, such as metal foil, for example. For ease of description, all surfaces (102a and 102b) making up the conductive region 102 (outside portion) and all surfaces (106a, 106b, and 106c) making up the conductive region 106 (inside portion) are referred to as conductive surfaces.

In exemplary embodiments, the PPTC tank heater 100 includes gaps 116, with the gaps that are horizontally disposed openings also known herein as slots 118. The gaps 116/slots 118 of the PPTC tank heater 100 are regions in which the heater body 104 is visible. Gap 116a/slot 118a is the region between conductive surfaces 102a and 102b; gap 116b/slot 118b is the region between conductive surfaces 106a and 106b; gap 116c/slot 118c is the region between conductive surfaces 106b and 106c; gap 116d is the region where the heater body 104 is visible along the circumferential edge (FIG. 1A), or the top surface (FIG. 1B), that is, between the conductive regions 102 and 106; and gap 116e is the region along the vertical opening (FIG. 1A) or the side surface (FIG. 1B) of the annular-shaped PPTC tank heater. In addition to exposing the heater body 104, the slots 118 are also regions in which the flow of current through the PPTC tank heater 100 is disrupted, in exemplary embodiments, as described in more detail herein. The slots 118 therefore may be thought of as "decision points" for the flow of current.

In exemplary embodiments, all conductive surfaces 102a, 102b, 106a, 106b, and 106c have the same width, w, and thickness, $t_1$. In some embodiments, the height of each conductive surface varies. Height, h, is given in FIG. 1B for conductive surface 102a. In some embodiments, the height of conductive surface 102a is larger than the height of conductive surface 102b. In some embodiments, the height of conductive surface 106b is larger than the heights of conductive surfaces 106a and 106c. In some embodiments, the height of conductive surface 106a is larger than the height of conductive surface 106c.

The PPTC tank heater 100 may be thought of as a one-sided electrode, three-slot design. This means that the PPTC tank heater 100 has three slots 118 and the electrodes (conductive surfaces 106a and 106c) are connected to respective leads 110 and 108 on one side of the conductive region 106. Other examples of PPTC tank heaters herein (FIGS. 5B and 12A) feature electrodes disposed on opposing sides of the heater body. As shown in FIGS. 1B and 1D, the heater body 104 is substantially planar in shape, having two opposing surfaces for connection to the conductive regions 102 and 106. The heater body has a thickness, $t_2$, which is adjustable, in exemplary embodiments. In an exemplary embodiment, the heater body 104 is less than 1 mm in thickness. The heater body is further described and illustrated in FIGS. 13A-13D, below.

FIG. 1C is photographic image of the PPTC tank heater 100, in accordance with exemplary embodiments. The PPTC tank heater 100 is an annular (ring) shape suitable to be placed around a cylindrical-shaped device to be heated, such as an inlet for a liquid tank, as shown in FIGS. 3A and 3B, below. Relative to prior art PTC devices, such as ceramic PTCs, the proximate positioning of the PPTC tank heater 100 increases the surface contact between PPTC tank heater and the cylindrical surface. Leads 108 and 110 are disposed on the inside surface of the PPTC tank heater 100.

FIG. 1D provides an exploded perspective view of the PPTC tank heater 100. Numbered lines illustrate a possible path for the flow of current through the PPTC tank heater 100, in exemplary embodiments, starting from lead 110. Current flows from a source of power connected to the lead 110 (not shown) to the conductive surface 106a (1). From there, the current could flow from conductive surface 106a to conductive surface 106b, across the slot 118b. However, in exemplary embodiments, the resistance of the slot 118b is designed to be larger than the resistance between the conductive surface 106a, through the heater body 104, and to the conductive surface 102a. In some embodiments, the higher resistance of the slot 118b is based on the width of the slot. Instead, the current travels from the conductive surface 106a through the heater body 104 (2), and to the conductive surface 102a (3). The part of the PPTC tank heater 100 traversed by the current in steps 1, 2, and 3 may be thought of as a first heating element. Thus, the first heating element is a sandwich consisting of the conductive surface 106a, the heater body 104, and the conductive surface 102a.

Next, the current travels across the conductive surface 102a (4). There is a slot 118a between the conductive surfaces 102a and 102b. Again, the current could travel across the slot 118a to conductive surface 102b. However, again by design, the slot 118a is designed to have a higher resistance than exists for the current to instead travel from conductive surface 102a, through heater body 104, to conductive surface 106b. Therefore, the current travels from the conductive surface 102a through the heater body 104 (5), then to the conductive surface 106b (6). The part of the PPTC tank heater 100 traversed by the current in steps 4, 5, and 6 may be thought of as a second heating element. Thus, the second heating element is a sandwich consisting of the conductive surface 102a, the heater body 104, and the conductive surface 106b.

Next, the current travels across the conductive surface 106b (7). As before, the slot 118c between conductive surface 106b and 106c is wide enough to have a higher resistance than where the current actually travels, which is from conductive surface 106b through heater body 104 (8) and to conductive surface 102b (9). This part of the PPTC tank heater 100 traversed by the current in steps 7, 8, and 9 may be thought of as a third heating element. Thus, the third heating element is a sandwich consisting of the conductive surface 106b, the heater body 104, and the conductive surface 102b.

Next, the current travels across the conductive surface 102b (10), through the heater body 104 (11), to the conductive surface 106c (12), and exits the PPTC tank heater 100 through lead 108 (13). This part of the PPTC tank heater 100 traversed by the current in steps 10, 11, 12, and 13 may be thought of as a fourth heating element. Thus, the fourth heating element is a sandwich consisting of conductive surface 102b, heater body 104, and conductive surface 106c. FIG. 1D is a somewhat simplified illustration of the current flow which, though shown as straight lines, is likely more distributed, particularly across the conductive surfaces (4, 7, and 10, e.g.) before traversing the heater body 104.

Thus, the PPTC tank heater 100 may be thought of as a series connection of four distinct heating elements. In exemplary embodiments, the PPTC tank heater 100 is designed so that the resistances of the four heating elements are different. The four distinct resistances result in four different power profiles created by each heating element. Thus, the surface temperatures resulting from the four power profiles are different, in exemplary embodiments. The design of the PPTC tank heater 100 thus enables differential heating of the object to which the PPTC tank heater is attached.

The resistances, and thus the temperature, of the four heating elements of the PPTC tank heater 100 may be modified based on: 1) the widths of the slots 118, where the width of slots 118a, 118b, and 118c may be different from one another; 2) the dimensions of the conductive surfaces 102a-b and 106a-c; 3) the dimensions of the heater body 104; 4) the composition of the heater body 104; 5) the height, $h_1$, and the diameter, $d_1$, of the PPTC tank heater 100; 6) the width of the gaps 116d/e, where the width of gap 116d is equal to the width of gap 116e; and 7) the diameter, $d_1$, of the annular structure (FIG. 1A). In exemplary embodiments, the modification of any feature of the PPTC tank heater 100 will affect its resistance.

$1^{st}$ Experiment

Figure 2A:
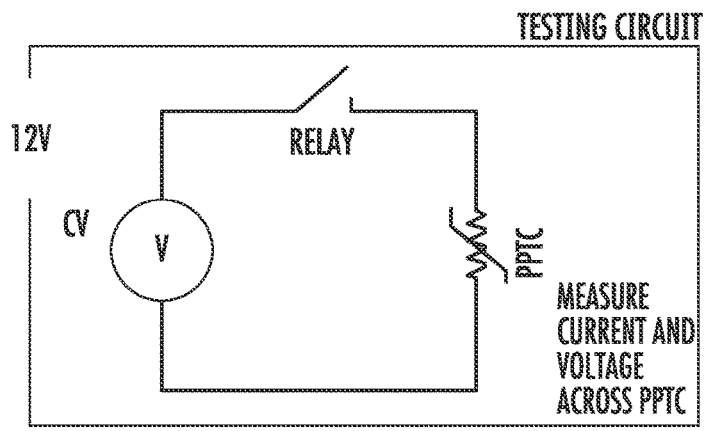
FIGS. 2A-2C are diagrams illustrating a test performed on the PPTC tank heater of FIGS. 1A-1D, in accordance with exemplary embodiments.
Figure 2B:
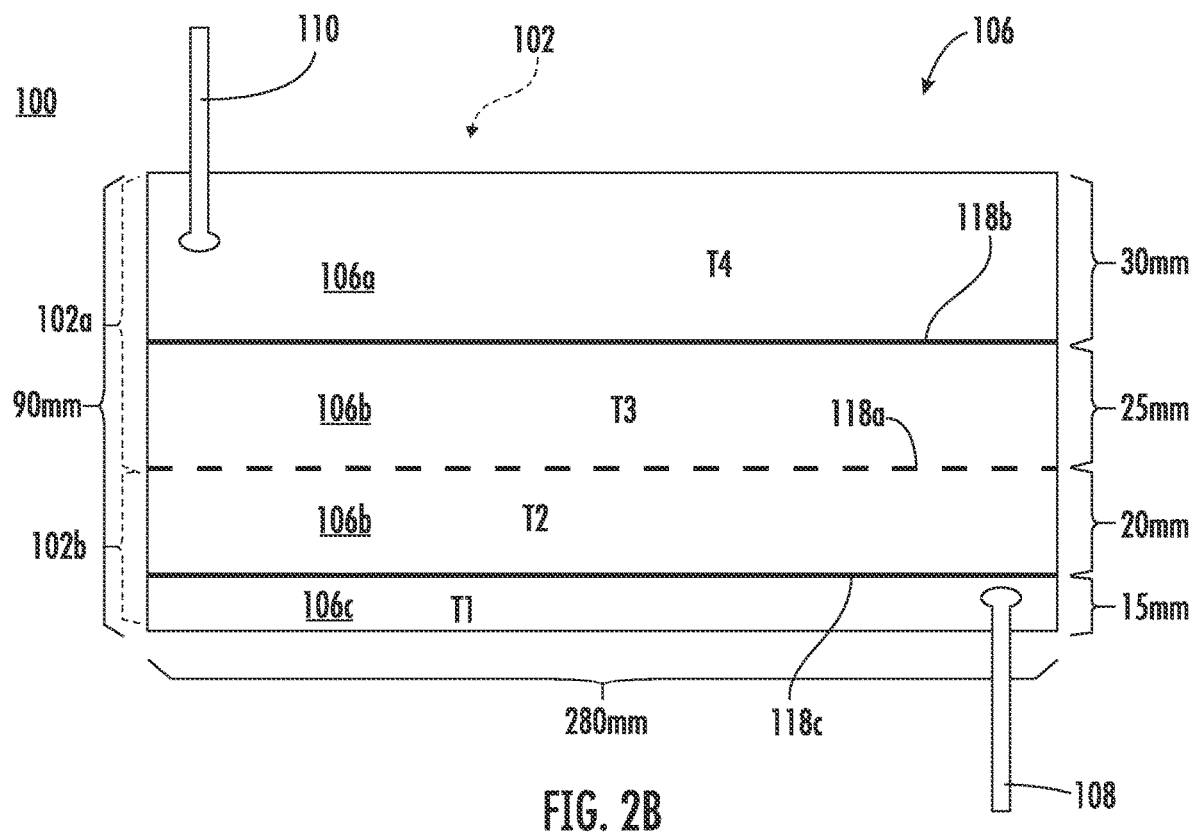
Figure 2C:
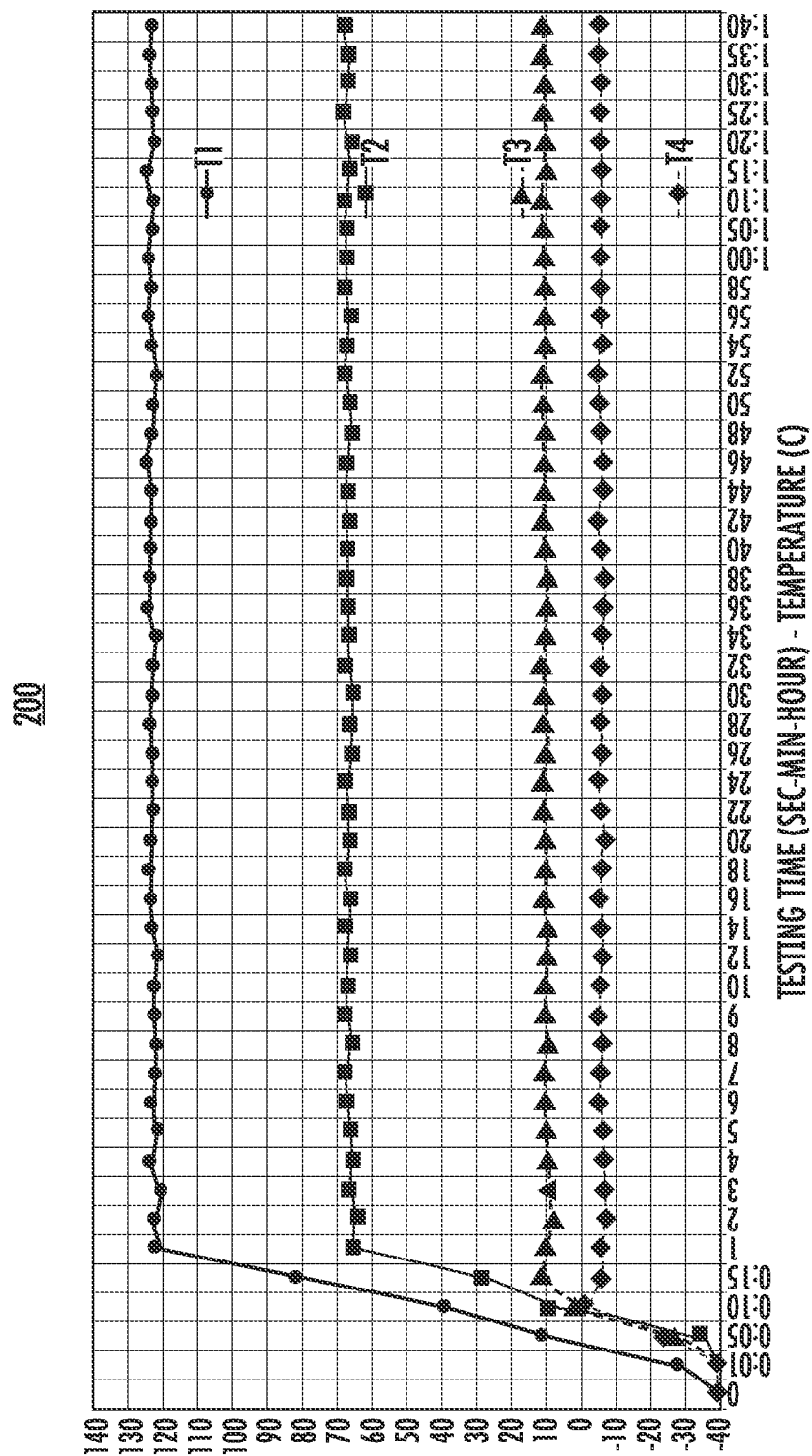

FIGS. 2A-2C are representative drawings related to an experiment performed with the annular PPTC tank heater 100 of FIGS. 1A-1D, according to exemplary embodiments. FIG. 2A is a testing circuit diagram; FIG. 2B is a side view of the flattened PPTC tank heater 100; and FIG. 2C is a graph showing results of the experiment. The testing circuit (FIG. 2A) consists of a 12V voltage source with a maximum current of 20 A, a relay, and the PPTC tank heater 100, which is submerged in a tank of liquid (such as in FIG. 3A), at a temperature of −40° C., with the temperatures across four points of the heater, denoted T1, T2, T3, and T4, being measured. The PPTC tank heater 100 has an initial resistance of 0.345 ohms, a height of 9.0 cm, a diameter ($d_1$ in FIG. 1A) of about 9 cm, an area of 252 cm², and no coating.

The side view of FIG. 2B shows the PPTC tank heater 100 with the conductive region 106 being in the front and conductive region 102 obscured from view. Conductive surfaces 106a, 106b, and 106c are visible, while conductive surfaces 102a and 102b are indicated with dotted lines on the left side of the image. Slots 118b and 118c are visible in the front and slot 118a, which is not visible from the front, is shown as a dotted line. In this experiment, conductive surface 106a has dimensions of 30 mm×280 mm; conductive surface 106b has dimensions of 45 mm×280 mm; conductive surface 106c has dimensions of 15 mm×280 mm; conductive surface 102a has dimensions of 55 mm×280 mm; and conductive surface 102b has dimensions of 35 mm×280 mm. In one embodiment, the width of the slots 118 is about 2 mm.

FIG. 2C is a graph 200 of the testing time versus temperature for the PPTC tank heater 100, according to exemplary embodiments. The temperature at the four testing points, T1, T2, T3, and T4 are measured. In exemplary embodiments, the four testing points correspond to the four heating elements described in FIG. 1D. Thus, testing point T4 corresponds to the first heating element consisting of heater body 104 sandwiched between conductive surfaces 102a and 106a; testing point T3 corresponds to the second heating element consisting of heater body 104 sandwiched between conductive surfaces 102a and 106b; testing point T2 corresponds to the third heating element consisting of heater body 104 sandwiched between conductive surfaces 102b and 106b; and testing point T1 corresponds to the fourth heating element consisting of conductive surfaces 102b and 106c.

Because the liquid in the tank is at −40° C., all four testing points start out at this temperature. The testing point T1 starts increasing faster than the testing points T2, T3, and T4. At five seconds, T1 is already above 10° C. The testing point T2 is at 10° C. in 10 seconds. Testing point T3 reaches 10° C. in about 15 seconds, while testing point T4 does not reach 10° C., but does reach about −5° C. within about 15 seconds. The graph 200 thus shows great variability at the different testing points.

Looking also at FIG. 2B, the graph 200 of FIG. 2C shows that the temperature increases the fastest at the lower portion of the PPTC tank heater 100. Thus, relative to the other heating elements, the temperature increases the fastest at the fourth heating element (T1), which is at the bottom of the PPTC tank heater 100. Relative to the other heating elements, the temperature increases the slowest in the first heating element (T4), which is at the top of the PPTC tank heater 100.

FIGS. 2B and 2C thus illustrate the differential nature of the PPTC tank heater 100, according to exemplary embodiments. The differential heating of the PPTC tank heater 100 may be useful in a variety of applications. One of the applications may be to heat liquid in a tank, with the PPTC tank heater 100 being placed strategically with the four testing points in mind to quickly and efficiently heat the liquid.

Liquid Injection Systems

FIGS. 3A and 3B, for example, are representative drawings of two liquid injection systems, according to exemplary embodiments. FIG. 3A features liquid injection system 310, which utilizes the PPTC tank heater 100 of FIGS. 1A-D; FIG. 3B features liquid injection system 320, which utilizes a different PPTC tank heater 300.

FIG. 3A shows the liquid injection system 310, including a storage tank 312 for storing a liquid, such as water, and an inlet 314 which is partially submerged inside the storage tank. In exemplary embodiments, the inlet 314 is cylindrical in shape. Although the storage tank 312 is also cylindrical in FIG. 3A, the storage tank may be any shape suitable for storing liquid, such as a cube, a rectangular cube, a bladder, or an irregular shape. Further, the storage tank 312 may be insulated to protect against freezing of the liquid stored inside the storage tank.

FIG. 3B shows the liquid injection system 320, including a storage tank 322 for storing a liquid, such as water, and an inlet 324 which is partially submerged inside the storage tank. As in the liquid injection system 310, the inlet 324 is cylindrical in shape, in exemplary embodiments, but the storage tank 322 may be any shape suitable for storing a liquid and may be insulated.

The liquid injection systems 310/320 may include means, such as a pump, to send water from respective storage tank 312/322, through the inlet 314/324, and to its intended destination. The liquid injection systems 310/320 may also include filters to be placed on the inlets 314/324.

The liquid injection system 310 in FIG. 3A includes the PPTC tank heater 100. In exemplary embodiments, the PPTC tank heater 100 is placed near the bottom of the inlet 314. Thus, where the liquid inside the tank 312 is frozen, whether the tank is 25% full, 50% full, or completely full, the liquid will be in the lower portion of the tank. The PPTC tank heater 100 is connected to a source, 316, such as a battery, located outside the tank 312, to power the PPTC tank heater.

When used to improve vehicle efficiency and power, the storage tank 312 may be filled with water and the inlet 314 may be connected to an engine of the vehicle. The water is pumped into an air intake as a fine mist, resulting in a cooling of the engine components during vehicle operation. Some vehicle manufacturers claim, for example, that the injection of water into the air intake to reduce the temperature inside the combustion chamber results in less fuel consumption, lower carbon dioxide emissions, and higher power.

Though materials exist to protect the liquid from freezing, there may nevertheless be environments in which the storage tank 312 freezes, causing the contents inside to also freeze. Where the storage tank 312 contains water, the water may become ice, which cannot be pumped through the inlet 314 to the air intake of the vehicle engine. The freezing thus limits the power and efficiency improvements available to the vehicle in warmer environments. Without the novel PPTC tank heater 100, the water injection system of the vehicle may not be used in certain climates or during certain times of the year.

The PPTC tank heater 100, however, is suitable to quickly melt the frozen liquid in the storage tank 312, in exemplary embodiments. The annular shape of the PPTC tank heater 100 surrounds the inlet 314 to efficiently heat the surface of the inlet. Being submerged in the storage tank 312, the heating of the inlet 314 will transfer heat quickly to the liquid in the storage tank 312. Where the storage tank 312 contains ice, the ice will quickly melt, thus enabling the vehicle to utilize the water injection system, even in severe temperature environments.

In comparing the liquid injection system 310 (FIG. 3A) and the liquid injection system 320 (FIG. 3B), the storage tank 322 is larger than the storage tank 312 and the inlet 324 has a diameter, $d_3$, which is larger than the diameter, $d_2$, of the inlet 314. Thus, for the liquid injection system 320, a different PPTC tank heater 300 is used. Where the PPTC tank heater 100 has a height, $h_1$, and diameter, $d_1$, the PPTC tank heater 300 has a height, $h_2$, and a diameter, $d_4$, where $h_2 > h_1$ and $d_4 > d_1$. In exemplary embodiments, both the PPTC tank heater 100 and the PPTC tank heater 300 are differential heaters, in that the heating at different testing points varies. The PPTC tank heater 300 substantially covers the surface of the inlet 324 whereas the PPTC tank heater 100 covers the lower portion of inlet 314. Further, the PPTC tank heater 300 features more slots than the three-slot, four heating element PPTC tank heater 100. The PPTC tank heater 300 is connected to a source, 326, such as a battery, located outside the tank 322, to power the PPTC tank heater. As will be shown, the principles of the PPTC tank heater 100 may be extended to N-slot configurations and M heating elements disposed in series with one another, for integers N and M. In exemplary embodiments, the PPTC tank heater 100 can thus be designed for step-heating in different heating areas of a device.

Ceramic PTC devices are unable to be placed in close proximity to a cylindrical object. The CPTC creates a single and intense source of heat. This means, that to melt liquid in a storage tank with more efficiency, heat sinks are used. The PPTC tank heater 100 allows the creation of distributed power on a wide surface, removing the need for the additional heatsink, which makes its design simpler, cheaper, and more reliable.

In exemplary embodiments, the PPTC tank heater 100 provides annular heating around the inlet 314 of the storage tank 312 with a filter to ensure clean liquid is available for the vehicle. Where the media inside the storage tank 312 freezes, its viscosity increases and may become honey-like or waxy. The presence of the filter may exacerbate the condition of the liquid. In exemplary embodiments, the PPTC tank heaters 100 and 300 are able to work in liquid injection systems with or without filters.

In exemplary embodiments, the carbon/graphene and semi-crystalline polymer of the heater body 104 of the PPTC tank heater 100 are configured with a self-regulation temperature around 125° C. This means that, as the temperature increases, the resistance of the PPTC tank heater 100 remains quite low until a predetermined "trip" temperature is reached. In empirical experiments, described in detail below, this trip temperature varies, depending on the configuration of the PPTC tank heater 100. Once the trip temperature is reached, there is some increase in resistance, with the resistance eventually shooting up very quickly once the temperature reaches about 125° C. Further, in exemplary embodiments, the temperature does not increase significantly above 125° C., which shows that the PPTC tank heater 100 is self-limiting above 125° C. In some embodiments, the PPTC tank heater 100 will not get dangerously hot, even where power to the device is disabled.

Thus, the PPTC tank heater 100 provides an advantage in the application of water injection systems, such as are used with vehicles. The temperature limitation feature ensures that no over-heating occurs when heating the storage tank. In FIG. 3A, the inlet 314 has a diameter, $d_2$. In exemplary embodiments, the diameter of the PPTC tank heater 100, $d_1$, is close to the inlet diameter, $d_2$, and can thus fit snugly around the inlet 314 so that the conductive region 106 (inside surface) of the heater is connected at all points to the outer surface of the inlet.

The PPTC tank heater 100 may be thought of as a three-slot differential sheet heater in which its four distinct heating elements exhibit different properties. In exemplary embodiments, these properties are designed to heat a tank containing liquid, where the volume of liquid varies at different times. Recall the seven characteristics cited thus far that may be modified to control the characteristic of each heating element: 1) the widths of the slots; 2) the dimensions of the conductive surfaces; 3) the dimensions of the heater body; 4) the composition of the heater body; 5) the height and the diameter of the PPTC tank heater; 6) the width of the gaps; and 7) the diameter of the annular structure. Further, in exemplary embodiments, the PPTC tank heaters described herein may be designed to also modify: 8) the number of slots; 9) the number of conductive regions; 10) whether the electrodes (and thus the leads) are on one side or two sides of the conductive surfaces; 11) whether the slots are horizontally disposed (as in FIGS. 1A-D) or vertically disposed (as in FIGS. 10A-10B and FIG. 11, below).

In exemplary embodiments, the PPTC tank heater 100 is thin (<1 mm) but has a large heating area (>10 cm in diameter). In some embodiments, the diameter, $d_1$, of the PPTC tank heater 100 is adjusted according to the heating application. Further, by placing the PPTC tank heater 100 in the target heating area of the liquid injection system 310, such as near the bottom of the tank, the resulting efficiency reduces heat loops and makes part design less complicated.

In exemplary embodiments, the PPTC tank heater 100 is adjustable, depending on whether the tank is full (100%), or partially full (e.g., 10%, 50%, 80%). Empirical results of several tests confirm this benefit and are shown and described below in conjunction with FIGS. 4A-4D and 5A-5D.

In some embodiments, additional "dummy" inlets may be added to the storage tank 312, with multiple PPTC tank heaters being disposed along each additional inlet. The dummy inlets may simply be solid cylinders, used not to transmit liquid away from the storage tank 312, but to transfer heat from respective PPTC tank heaters into the storage tank. Further, in some embodiments, a PPTC tank heater, not in annular form, but flattened out, may be disposed at the bottom of the storage tank 312, for optimal heating even when the tank is close to being empty of liquid media. In exemplary embodiments, the PPTC tank heater 100 is insulated with a coating to avoid short circuiting in ice or water, as well as other electrically conductive fluids.

$2^{nd}$ Experiment

Figure 4A:
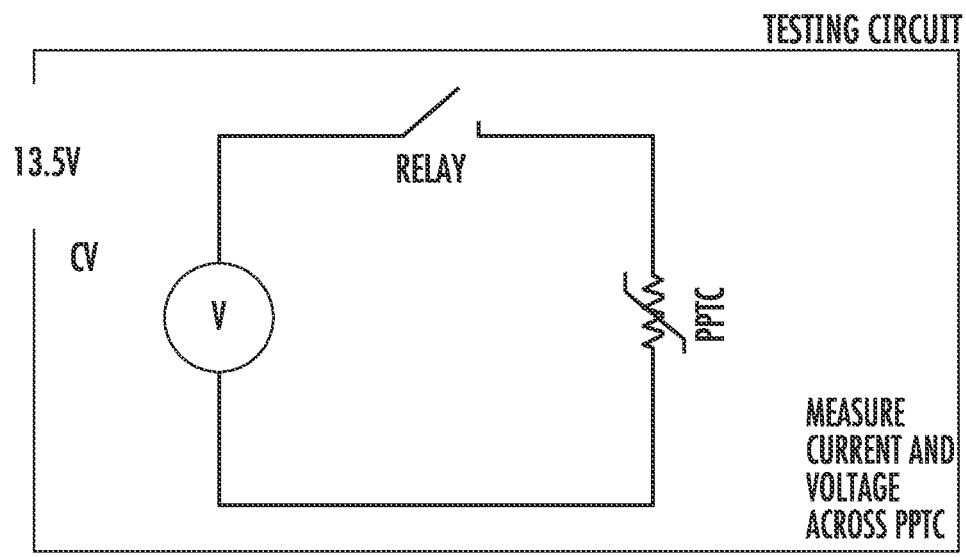
Figure 4B:
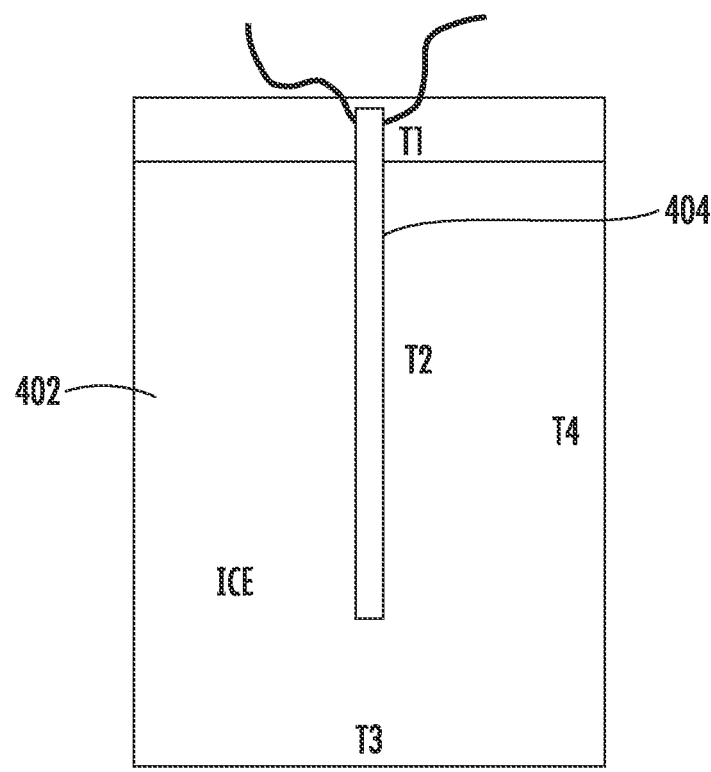

FIGS. 4A-4D are representative drawings related to an experiment performed with an annular-shaped PPTC tank heater, such as the PPTC tank heater 100, according to exemplary embodiments. FIG. 4A shows the testing circuit used, FIG. 4B is the experimental storage tank and inlet to which the PPTC tank heater is attached, and FIGS. 4C and 4D are graphs showing results of the experiment. The testing circuit (FIG. 4A) consists of a 13.5V voltage source, a relay, and the PPTC tank heater (not shown) submerged in frozen ice, with the current and voltage across the PPTC device being measured. The test environment (FIG. 4B) is a plastic container 402 that holds 3.5 liters of water that has been frozen, with a PPTC tank heater 404 disposed therein. Four locations of the container 402 are tested for temperature data, denoted, T1, T2, T3, and T4. The PPTC tank heater 404 has a 100 mm height, a 0.55 mm thickness, and a 100 mm diameter. The PPTC tank heater 404 further has two horizontal conductive surfaces on one side of the PTC material and one full-sized conductive surface on the opposing side of the PTC material (see, e.g., PPTC tank heater 600 in FIGS. 6A-6D).

FIG. 4C is a graph 400 of the temperature versus resistance for the PPTC tank heater, according to exemplary embodiments. The graph 400 shows that the resistance of the PPTC tank heater stays very close to 0 ohms until the temperature reaches about 125° C. Above 125° C., the resistance increases very quickly to an extremely high resistance. The experiment thus shows that the PPTC tank heater creates a single and intense source of heat. Further, the temperature of the PPTC tank heater does not appear to exceed about 130° C. The experiment thus shows that the PPTC tank heater is self-regulating to limit over-heating.

The graph 450 of FIG. 4D is also illustrative of the PPTC tank heater capability. The graph plots time versus temperature of the four plot points shown in FIG. 4B, T1, T2, T3, and T4 inside the tank 402. T1 is at the top of the inlet 404 (outside the ice), T2 is in the submerged ice, near the inlet, T3 is at the bottom of the tank beneath the inlet, and T4 is at one edge of the tank. Looking from the top of the graph 450 to the bottom at time 10 minutes, T1 is the first line (circles), T2 is the second line (squares), T4 is the third line (triangles), and T3 is the fourth line (diamonds). All four plot points show that the temperature is at about −10° C. at time 0.

Within the first five minutes, the temperature of T1 has increased significantly (above 40° C.). Within ten minutes, T2 and T4 have both moved to about 0° C. (the melting point of water). Within about 35 minutes, all four plot points have reached the 0° C. temperature, even T3 at the very bottom of the tank 302. Within 60 minutes, all four plot points are above the 0° C. freezing temperature of water.

$3^{rd}$ Experiment

Figure 5A:
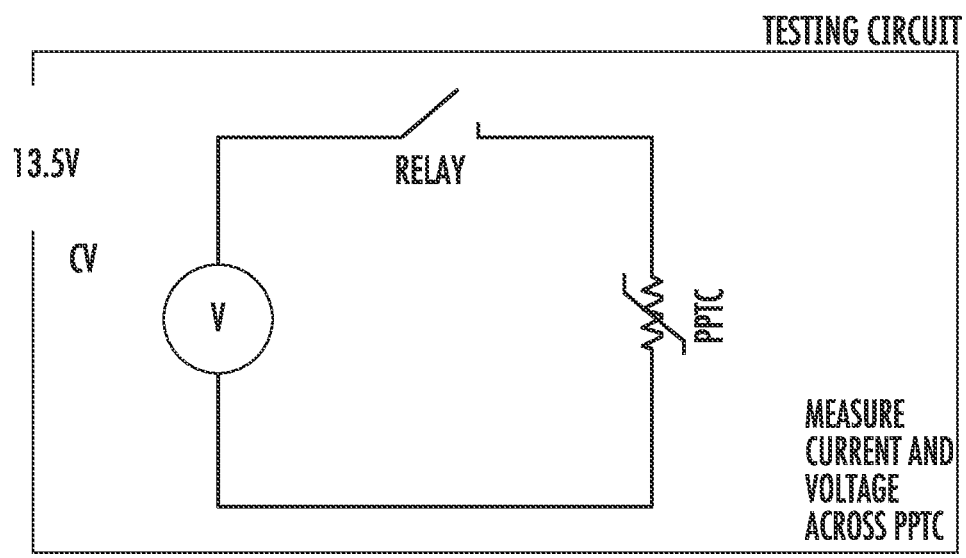
FIGS. 5A-5D are diagrams illustrating a test performed on a flat PPTC tank heater, in accordance with exemplary embodiments.
Figure 5B:
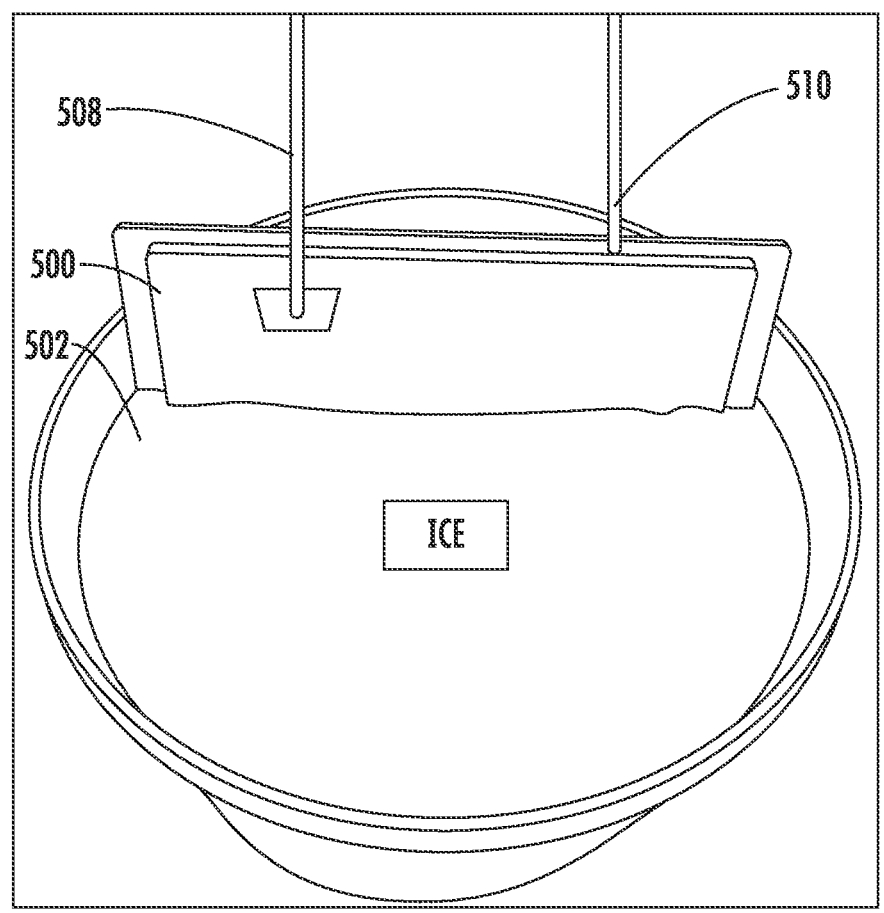
Figure 5C:
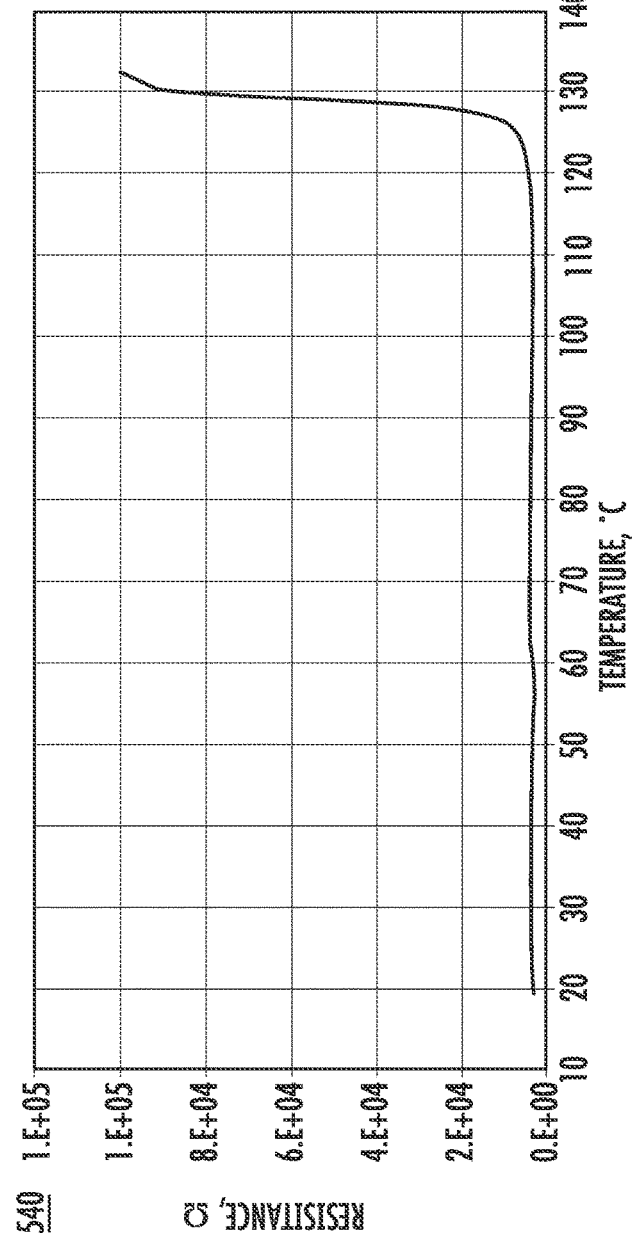
Figure 5D:
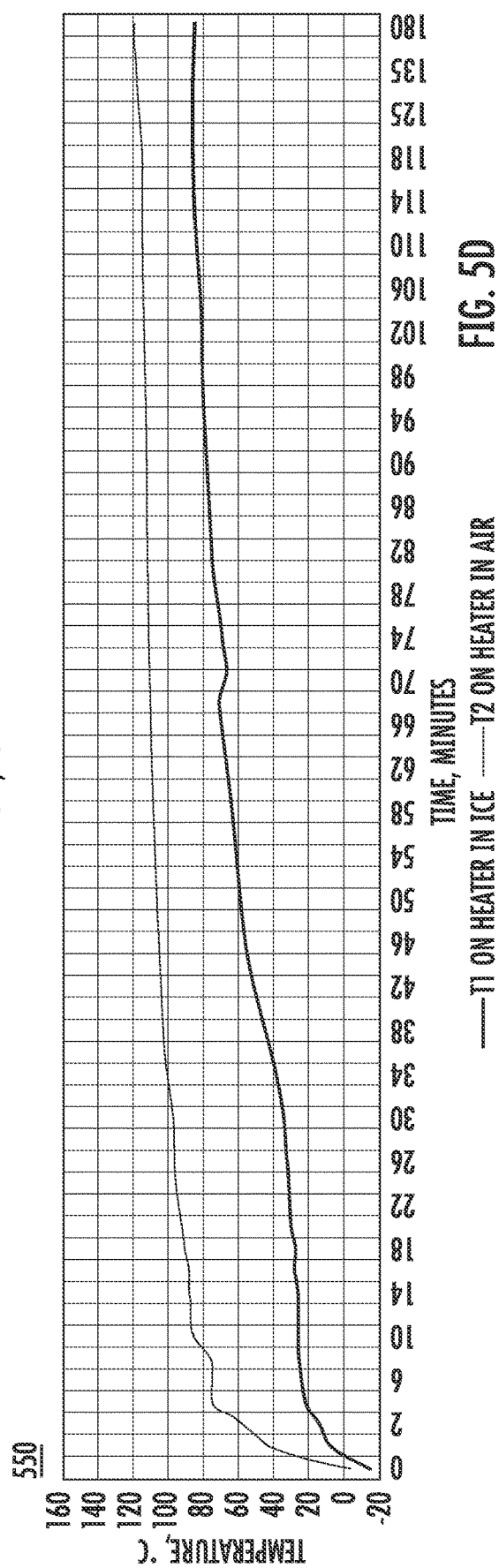

FIGS. 5A-5D are representative drawings related to a third experiment performed with a PPTC tank heater, according to exemplary embodiments. FIG. 5A shows the testing circuit used, FIG. 5B is a photograph of the experimental storage tank to which PPTC tank heater 500 is attached, and FIGS. 5C and 5D are graphs showing results of the experiment. The testing circuit (FIG. 5A) consists of a 13.5V voltage source, a relay, and the PPTC tank heater, with the current and voltage across the PPTC device being measured. The test environment (FIG. 5B) is a plastic container 502 that holds 1 liter of water that has been frozen and the PPTC tank heater 500, which is a flat rectangular structure, is partially submerged in the ice. In this experiment, the leads 508 and 510 are on opposing sides of the PPTC tank heater 500. Two locations are tested for temperature data, denoted T1 and T2, where T1 is on the PPTC tank heater in ice and T2 is on the PPTC tank heater in the air (outside the tank 502. The PPTC tank heater used has a 950 mm height, a 120 mm width, and a 0.55 mm thickness.

FIG. 5C is a graph 540 of the temperature versus resistance for the PPTC tank heater, according to exemplary embodiments. The graph 540 shows that the resistance of the PPTC tank heater stays very close to 0 ohms until the temperature reaches about 125° C. Above 125° C., the resistance increases very quickly to an extremely high resistance. The experiment thus shows that the PPTC tank heater creates a single and intense source of heat. Further, the temperature of the PPTC tank heater does not appear to exceed about 135° C. The experiment thus shows that the PPTC tank heater is self-regulating to limit over-heating.

The graph 550 of FIG. 5D is also illustrative of the PPTC tank heater capability. The graph plots time versus temperature of two plot points, T1 (on the PPTC tank heater 500 in the ice) and T2 (on the PPTC tank heater, in the air). At time 0, T1 is about −18° C. and T2 is about −2° C. At about five minutes, T1 is about 20° C. and T2 is about 75° C. At about 20 minutes, T1 is about 32° C., enough to melt the ice, and T2 is above 90° C. Within an hour, T1 is above 60° C. and T2 is above 100° C. The three experiments of FIGS. 2A-2C, 4A-4D, and 5A-5D thus show that the PPTC tank heater may be useable, such as for the liquid injection system of a vehicle.

In exemplary embodiments, the annular PPTC tank heater provides 360° of heating around the cylindrical inlet of the storage tank. The self-regulating capability of the PPTC tank heater limits over-heating concerns. The PPTC tank heaters are capable of providing self-balancing heating for a partial or a full tank. The PPTC tank heaters work against hot spots. The PPTC tank heaters can be used without heat sinks, which may be expensive and/or bulky. The PPTC tank heaters are designed for temperature distribution in heating, due to the differential design of N slots and M heating elements disposed in series with one another, for integers N and M. By coating the PPTC tank heaters with waterproof insulation, they may be immersed in the water/ice as well as other electrically conductive fluids.

Alternative Embodiments

Figure 10A:
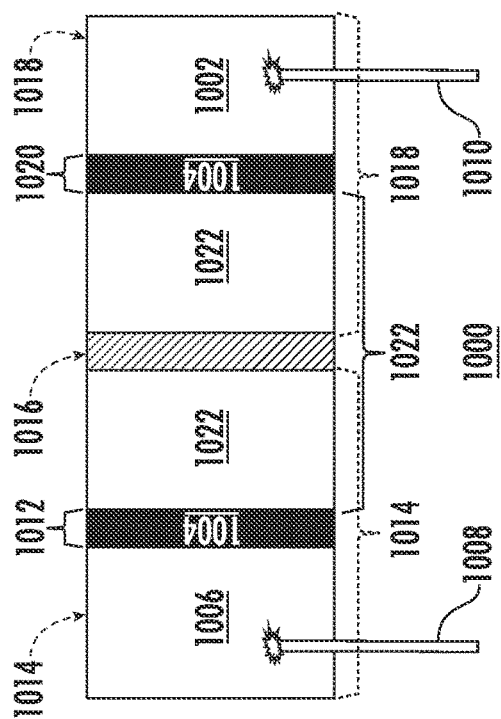
FIGS. 10A-10C are diagrams illustrating a PPTC tank heater, in accordance with exemplary embodiments.
Figure 10B:
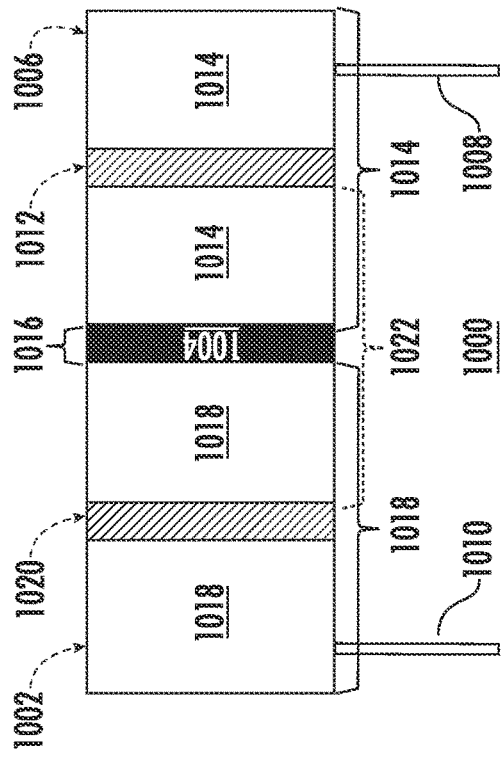
Figure 10C:
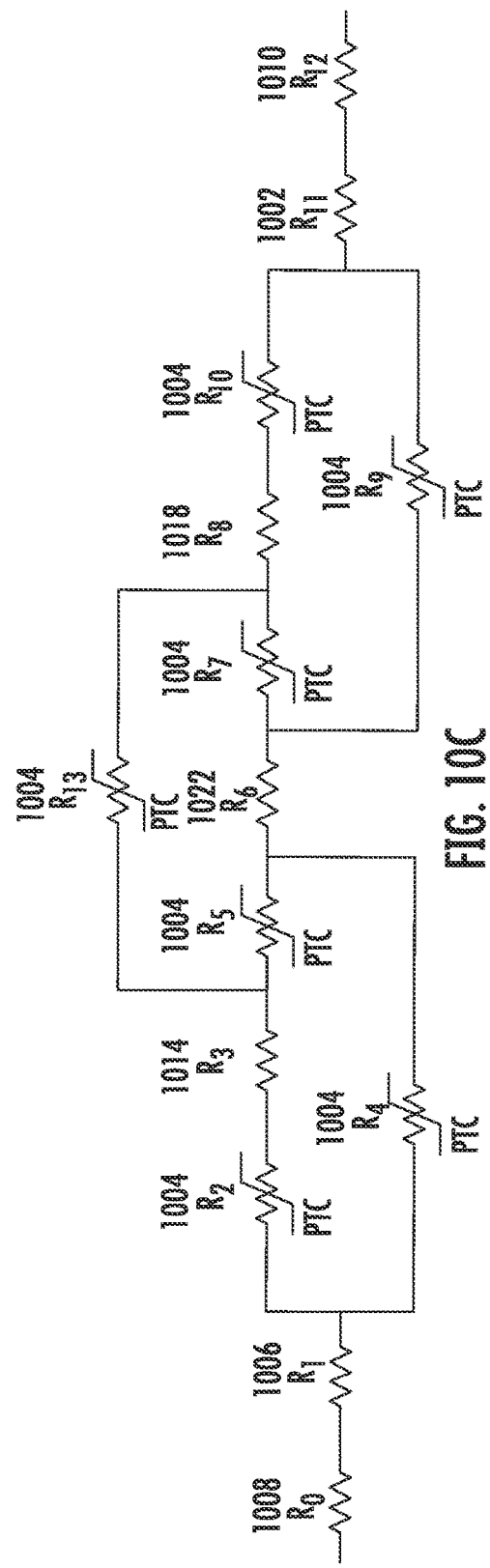
Figure 11:
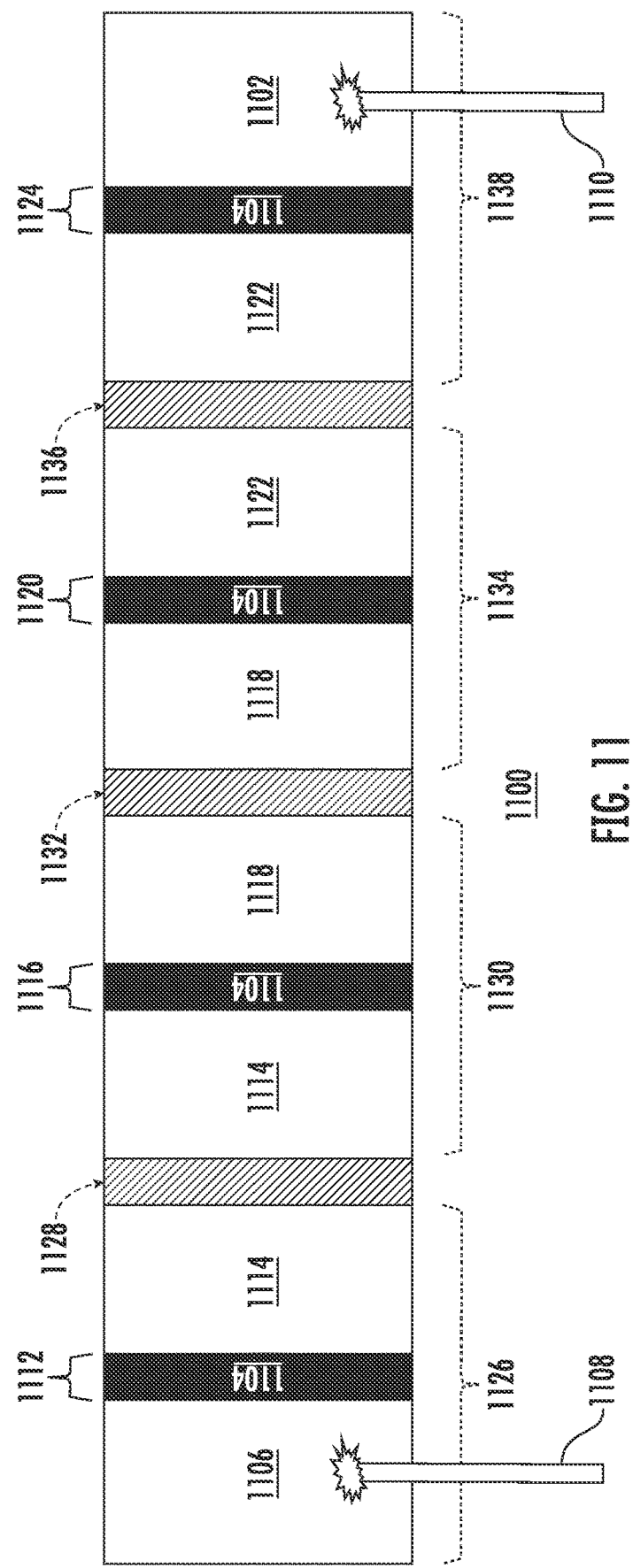
FIG. 11 is a diagram illustrating a PPTC tank heater, in accordance with exemplary embodiments.

FIGS. 6A-6D (PPTC tank heater 600), FIGS. 7A-7C (PPTC tank heater 700), FIGS. 9A-9C (PPTC tank heater 900), FIGS. 10A-10C (PPTC tank heater 1000), FIG. 11 (PPTC tank heater 1100), and FIGS. 12A-12D provide alternatives to the above-referenced PPTC tank heaters 100 and 300, according to exemplary embodiments. Each of these PPTC tank heaters may be suitable for heating liquid in a tank, such as the liquid injection systems 310 and 320 (FIGS. 3A-3B), according to exemplary embodiments. For each of the PPTC tank heater designs, the heater body is further described and illustrated in FIGS. 13A-13D, below.

The below examples, which are not meant to be limiting, show variations in number of slots, disposition of slots (horizontal or vertical), and disposition of the leads, described as either one-sided electrode (as in PPTC tank heaters 100, 300, 600, 700, 900, and 1100) or two-sided electrode (as in PPTC tank heaters 1000 and 1200). In addition to these variations, the widths of the slots, the dimensions of the conductive surfaces, the dimensions of the heater body, the composition of the heater body, the width of the gaps, the height and diameter of the annular structure, and the number of conductive regions may be varied from the embodiments presented herein. Based on these characteristics, the number of heating elements making up the PPTC tank heater and the differential heat output produced by each heating element, as described in FIG. 1D and measured by testing points T1-T4 in FIG. 2B), may be modified to adapt to a particular application, in exemplary embodiments.

PPTC Tank Heater 600—One-Sided Electrode, One Horizontal Slot

FIGS. 6A-6D are representative drawings of a PPTC tank heater, according to exemplary embodiments. FIG. 6A is a side plan view, FIG. 6B is a top cross-sectional view, FIG. 6C is a bottom cross-sectional view, and FIG. 6D is an illustration, respectively, of the PPTC tank heater 600. The PPTC tank heater 600 includes a heater body 604 consisting of a PTC material. The heater body 604 is substantially planar in shape, having two opposing surfaces. In an exemplary embodiment, the heater body 604 is less than 1 mm in thickness.

The PPTC tank heater 600 includes a conductive surface 602 and a conductive surface 606, which are disposed on opposing surfaces of the heater body 604. The conductive surfaces 602/606 are separated by a slot 616, where no conductive surface is present and the heater body 604 is exposed at the slot. In the side plan view of FIG. 6A, the slot 616 is horizontally disposed, with the conductive surface 606 being below the slot 616 and the conductive surface 602 being above the slot. Thus, the conductive surface 606 is not visible in the top cross-sectional view of FIG. 6B while the conductive surface 602 is not visible in the bottom cross-sectional view of FIG. 6C. A lead 608 is connected to the conductive surface 606 while a lead 610 is connected to the conductive surface 602. A conductive surface 612 is disposed on a second opposing surface of the two conductive surfaces 602 and 606.

FIGS. 6B and 6C further illustrate the conductive surface 612 disposed on the opposing surface of the heater body 604, the opposing surface being opposite from the surface on which the first and second conductive surfaces 602 and 606 are disposed. The heater body 604 has a thickness 614. The heater body 604 is thus sandwiched between conductive surface 602/606 on one side and conductive surface 612 on the other side, with the slot 616 exposing the heater body between conductive surface 602 and 606.

FIG. 6D is photographic image of the PPTC tank heater 600, in accordance with exemplary embodiments. The PPTC tank heater 600 is an annular (ring) shape suitable to be placed around a cylindrical-shaped device to be heated. The conductive surfaces 602 and 606 are disposed on an inside surface of the annular shape of the PPTC tank heater 600, while the conductive surface 612 is disposed on an outside surface. The PPTC material of the heater body 604 is shown both in between the conductive surfaces 602 and 606 (as a horizontally disposed opening) and along upper and side edges of the ring.

In an exemplary embodiment, the PPTC tank heater 600 is thin (less than 1 mm in thickness) but is large in diameter (more than 10cm in diameter). Thus, in exemplary embodiments, the PPTC tank heater 600 is able to surround a relatively large cylindrical object. The first characteristic (thinness) ensures its direct contact with the cylindrical structure, which results in high heat efficiency, in some embodiments, while the second characteristic (large diameter) enables the cylindrically shaped PPTC tank heater 600 to provide heating to a cylindrical shape of a predetermined size close to 10 cm, thus enabling quick and efficient heating of the subject surface.

PPTC Tank Heater 700—One-Sided Electrode, One Vertical Slot

FIGS. 7A-7C are representative drawings of a PPTC tank heater, according to exemplary embodiments. FIG. 7A is a side plan view, FIG. 7B is a top cross-sectional view, and FIG. 7C is a photographic illustration respectively, of the PPTC tank heater 700, according to exemplary embodiments. The PPTC tank heater 700 includes a heater body 704 consisting of a PTC material. The heater body 704 is substantially planar in shape, having two opposing surfaces. In an exemplary embodiment, the heater body 704 is less than 1 mm in thickness.

The PPTC tank heater 700 includes a conductive surface 702 and a conductive surface 706, which are disposed on a first opposing surface of the heater body 704. The conductive surfaces 702/706 are separated by a slot 716, where no conductive layer is present and the heater body 704 is exposed at the slot. In the side plan view of FIG. 7A, the slot 716 is vertically disposed, with the conductive surface 706 being to the left of the slot and the conductive surface 702 being to the right of the slot. A lead 708 is connected to the conductive surface 706 while a lead 710 is connected to the conductive surface 702. A conductive surface 712 is disposed on a second opposing surface of the conductive surfaces 702 and 706.

FIG. 7B further illustrates the 712 disposed on the opposing surface of the heater body 704, the surface being opposite from the surface on which the conductive surfaces 702 and 706 are disposed. The heater body 704 has a thickness 714. The heater body 704 is thus sandwiched between conductive surfaces 702/706 on one side and conductive surface 712 on the other side, with the slot 716 exposing the heater body between conductive surfaces 702 and 706.

FIG. 7C is a photograph of the PPTC tank heater 700, in accordance with exemplary embodiments. The PPTC tank heater 700 is an annular shape suitable to be placed around a cylindrical-shaped device to be heated. Conductive surfaces 702 and 706 are disposed on an inside surface of the annular shape of the PPTC tank heater 700, while conductive surface 712 is disposed on an outside surface. The PPTC material of the heater body 704 is shown both in between the conductive surfaces 702 and 706 (as a vertically disposed opening) and along upper and side edges of the ring. Leads 708 and 710 are disposed on the conductive surfaces 706 and 702, respectively. The PPTC tank heaters 600 and 700 exhibit the same general power designs, with N=1 (where N represents the total number of slots on both sides of the conductive surfaces).

FIGS. 8A-8C are representative drawings illustrating properties of the PPTC tank heaters 600 and 700, in accordance with exemplary embodiments. FIG. 8A presents an equivalent circuit of the PPTC tank heaters 600 (FIGS. 6A-6C) and 700 (FIGS. 7A-7C), according to an exemplary embodiment. $R_0$ and $R_7$ represent the resistance of the leads 608/708 and 610/710, respectively (and vice-versa), $R_1$ and $R_6$ represent the resistance of the conductive surfaces 602/702 and 606/706 respectively (and vice-versa), $R_3$ represents the resistance of conductive surface 612/712, and $R_2$, $R_4$, and $R_5$ represent the heater body 604/704 (PTC material). In an exemplary embodiment, the resistance $R_4$ is significantly greater than the resistances $R_2$ or $R_5$.

Although there is a single heater body 604/704 of PTC material, the flow of current through the heater 600/700 may take three possible paths through the PTC material of the heater body 604/704, as given by $R_2$, $R_4$, and $R_5$. FIG. 8B illustrates the three possible current paths through the heater body that may occur with the PPTC tank heaters 600 and 700, according to exemplary embodiments. The arrows 802, 804, and 806 show the direction of current flow through the PPTC material. FIG. 8A shows that there are two possible paths for current flow. A first current path goes through the $R_0$, $R_1$, $R_2$, $R_3$, $R_5$, $R_6$, and $R_7$, and vice-versa. The arrows 802 and 804 are thus sub-paths of the first current path. The second current path goes through $R_0$, $R_1$, $R_4$, $R_6$, and $R_7$. The arrow 806 is thus part of the second current path.

At the resistance $R_2$ (indicated by arrow 802), the current flows through the PPTC material between the conductive surface 606/706 ($R_1$) and the conductive surface 612/712 ($R_3$). At the resistance $R_5$ (indicated by the arrow 804), the current flows through the PPTC material between the conductive surface 612/712 ($R_3$) and the conductive surface 602/702 ($R_6$). At the resistance $R_4$ (indicated by the arrow 806), the current flows through the PPTC material between the conductive surface 606/706 ($R_1$) and the conductive surface 602/702 ($R_6$). Because the resistance $R_4$ is significantly greater than the resistances $R_2$ or $R_5$, in exemplary embodiments, the third current flow direction ($R_4$) is less likely to occur than the other current flow directions given by resistances $R_2$ or $R_5$.

FIG. 8C is a representative drawing of the PPTC tank heaters 600 or 700 in an annular shape, according to exemplary embodiments. FIG. 8C is used to illustrate the possible current flow directions through the annular-shaped PPTC tank heaters 600 (FIG. 6D) and 700 (FIG. 7C). The annular-shaped ring consists of the heater body 604/704 in the center, with conductive surface 612/712 surrounding on an outer surface of the ring and conductive surface 606/706 and conductive surface 602/702 disposed on the inside surface of the ring. For the PPTC tank heater 600, the conductive surface 602 is disposed above the first conductive surface 606 (see also FIGS. 6A and 6D) on the inside surface of the ring. For the PPTC tank heater 700, the conductive surface 706 is disposed on one side while the conductive surface 702 is disposed on the other side of the inside surface of the ring (see also FIGS. 7A and 7C).

As in FIG. 8B, the arrows in FIG. 8C show the possible direction of current flow. Starting with the lead 608/708 (indicated by arrow 808 and the resistance $R_2$), the current flows from the conductive surface 606/706 across the PPTC material of the heater body 604/704, to the conductive surface 612/712 disposed on the opposing side of the heater body. Current flows along the conductive surface 612/712 (indicated by arrow 810 and the resistance $R_3$). Current next flows from the conductive surface 612/712 across the PPTC material of the heater body 604/704 to the lead 610/710 (indicated by the arrow 812 and resistance $R_5$). Alternatively, current may flow between conductive surface 606/706 to conductive surface 602/702, as indicated by arrows 814 and 816 (and vice-versa), as also indicated by the resistance $R_4$.

In various embodiments, the design of the heater body and conductive surfaces of the PPTC tank heaters 600 and 700 may be such that the value of $R_4$ is much greater than the value of $R_2$ or $R_5$ (FIG. 8A). This situation may be accomplished in the PPTC tank heater 600 (FIGS. 6A-6C) and the PPTC tank heater 700 (FIGS. 7A and 7B) by arranging the thickness 614/714 of the heater body 604 to be relatively less than the slot 616/716. In an exemplary embodiment, the thickness 614 of the heater body 604 (FIGS. 6B-6C) or the thickness 714 of the heater body 704 (FIG. 7B) is between 3 mils and 120 mils in various non-limiting embodiments, between 5 mils and 10 mils in some embodiments, while the value of the slot, either the horizontally disposed slot 616 between conductive surface 602 and conductive surface 606 (FIG. 6A), or the vertically disposed slot 716 between conductive surface 702 and conductive surface 706 (FIG. 7A), is relatively greater than the thickness 616/716 of respective heater bodies 604/704. For example, if the thickness 620 of the heater body 604 is 10 mils, the value of slots 616 or 716 may be 50 mils or greater, ensuring that $R_4$ is much larger than $R_2$ or $R_5$.

In an exemplary embodiment, the resistance of the PPTC tank heaters 600 and 700 represented by the equivalent circuit (FIG. 8A) is approximately the value of the initial resistance multiplied by 4 ($R \approx 4R_i$ when $R_2 = R_5$ and the heater is in a non-tripping state). According to variants of these embodiments, the design of the slot location (616 or 716) can determine the heating effect (one side higher; another side lower, by controlling the resistance of each PPTC segment) on the top and bottom (PPTC tank heater 600) or on the left and right sides (PPTC tank heater 700). In one embodiment, the PPTC tank heater 600 design has a better mechanical strength than the PPTC tank heater 700 in examples where the overall heater is to be bent in an annular shape.

PPTC Tank Heater 900—One-Sided Electrode, Three Horizontal Slots

FIGS. 9A-9C are representative drawings illustrating PPTC tank heater 900, according to exemplary embodiments. FIG. 9A features a first side plan view of PPTC tank heater 900; FIG. 9B features a second (opposing) side plan view of PPTC tank heater 900; and FIG. 9C is the equivalent circuit for PPTC tank heater 900.

Conductive surface 906 is connected to lead 908 and conductive surface 902 is connected to lead 910. Three additional conductive surfaces 914, 918, and 922 are also shown. The PPTC tank heater 900 thus includes five conductive surfaces 902, 906, 914, 918, and 922 Conductive surfaces 902, 922, and 906, are visible on one side of the PPTC tank heater 900 (FIG. 9A) while two conductive surfaces 914 and 918 are visible on the opposing side of the PPTC tank heater (FIG. 9B). Slots 912, 916, and 920 are regions in which the heater body 904 is exposed. Thus, slots 912 and 920 are visible on one side of the PPTC tank heater 900 (FIG. 9A), while slot 916 is visible on the opposing side of the PPTC tank heater (FIG. 9B). Where disposed on the opposing side of the PPTC tank heater 900, the slots 912, 916, and 920 are shown with a lighter shading.

Thus, conductive surface 902 is separated from conductive surface 922 by slot 912 and conductive surface 922 is separated from conductive surface 906 by slot 920, where each slot 912, 920 exposes the heater body 904 of PPTC material (FIG. 9A). On the opposite surface of the PPTC tank heater 900, conductive surface 918 is separated from conductive surface 914 by slot 916, which exposes the heater body 904 of PPTC material (FIG. 9B). The slots 920 and 912 thus define regions along the one surface of PPTC tank heater 900 that are relatively higher resistance, as compared to the resistance of the conductive surfaces 902, 922, and 906, whereas the slot 916 defines a region along the opposing surface of PPTC tank heater that is relatively higher resistance, as compared to the resistance of the conductive surfaces 914 and 918. The slots 912, 916, and 920 are arranged to extend perpendicularly with respect to the general direction of the leads 908 and 910.

The PPTC tank heater 900 may be characterized by the equivalent circuit shown in FIG. 9C, where $R_0$ and $R_{12}$ represent the resistance of the leads 908, 910, $R_1$ and $R_{11}$ represent resistance of the conductive surfaces 906 and 902, $R_3$, $R_6$, and $R_8$ represent resistance of the conductive surfaces 914, 922, and 918, $R_2$, $R_5$, $R_7$, and $R_{10}$ represent the resistance of the heater body 904 to current flowing through the thickness of the heater body 904, that is, perpendicular to both leads 908, 910 (Y direction) and the slots 912, 916, and 920 (X direction), or in a Z direction, and $R_4$, $R_9$, and $R_{13}$ represent resistance of the heater body 904 to current flowing along the surfaces of heater body 904, that is, parallel to the leads 908, 910 (Y direction), but perpendicular to the slots 912, 916, and 920, or in a Y direction. In particular, during operation below the trip temperature, the current of the PPTC tank heater 900 may flow between lead 908 and lead 910 by flowing mainly through lead 908 ($R_0$) through conductive surface 906 ($R_1$); through the thickness of the heater body 904 ($R_2$) (in the Z direction); along the surface of conductive surface 914 ($R_3$) which is along the backside of the heater body (FIG. 9B); back through the thickness of the heater body 904 ($R_5$), in the Z direction to the front of the device (FIG. 9A); along conductive surface 922 ($R_6$); through the thickness of the heater body 904 ($R_7$) in the Z direction to the back of the device (FIG. 9B); along conductive surface 918 ($R_8$); through the thickness of the heater body 904 ($R_{10}$) in the Z direction, again to the front of the device (FIG. 9A); and through the conductive surface 902 ($R_{11}$) and the lead 910 ($R_{12}$). In other words, during operation below the trip temperature, the current does not jump in the Y direction across the slots 912 or 920 on the front side of the device, nor across the slot 916 on the back side of the device. Generally, because the size of the slots 916, 912, 920 may be much larger than the thickness of the heater body 904, the current does not typically flow along the paths in the plane of the heater body (in the Y direction) as indicated by resistances $R_4$, $R_9$, $R_{13}$.

PPTC Tank Heater 1000—One-Sided Electrode, Three Vertical Slots

FIGS. 10A-10C are representative drawings illustrating novel PPTC tank heater 1000, according to exemplary embodiments. FIG. 10A features a first side plan view of PPTC tank heater 1000; FIG. 10B features a second (opposing) side plan view of PPTC tank heater 1000; and FIG. 10C is the equivalent circuit for PPTC tank heater 1000. The heater configuration of PPTC tank heater 1000 is generally the same as for the PPTC tank heater 900, except that slots are arranged to extend generally parallel with respect to the general direction of the leads.

Conductive surface 1006 is connected to lead 1008 and conductive surface 1002 is connected to lead 1010. Three additional conductive surfaces 1014, 1018, and 1022 are also shown. The PPTC tank heater 1000 thus includes five conductive surfaces 1002, 1006, 1014, 1018, and 1022. Three of the conductive surfaces 1006, 1022, and 1002, are visible on one side of the PPTC tank heater 1000 (FIG. 10A) while two of the conductive surfaces 1014 and 1018 are visible on the opposing side of the PPTC tank heater (FIG. 10B). Slots 1012, 1016, and 1020 are regions in which the heater body 1004 is exposed. Thus, slots 1012 and 1020 are visible on one side of the PPTC tank heater 1000 (FIG. 10A), while slot 1016 is visible on the opposing side of the PPTC tank heater (FIG. 10B). Where disposed on the opposing side of the PPTC tank heater 1000, the slots 1012, 1016, and 1020 are shown with a lighter shading.

Thus, conductive surface 1006 is separated from conductive surface 1022 by slot 1012 and conductive surface 1022 is separated from conductive surface 1002 by slot 1020, where each slot 1012, 1020 exposes the heater body 1004 of PPTC material (FIG. 10A). On the opposite surface of the PPTC tank heater 1000, conductive surface 1018 is separated from conductive surface 1014 by slot 1016, which exposes the heater body 1004 of PPTC material (FIG. 10B). The slots 1020 and 1012 thus define regions along the one surface of PPTC tank heater 1000 that are relatively higher resistance, as compared to the resistance of the conductive surface 1006, 1022, and 1002, whereas the slot 1016 defines a region along the opposing surface of PPTC tank heater that is relatively higher resistance, as compared to the resistance of the conductive surfaces 1014 and 1018. The slots 1012, 1016, and 1020 are arranged to extend parallel with respect to the general direction of the leads 1008 and 1010.

The PPTC tank heater 1000 may be characterized by the equivalent circuit shown in FIG. 10C. In exemplary embodiments, the equivalent circuit of FIGS. 9C and 10C are substantially similar. $R_0$ and $R_{12}$ represent the resistance of the leads 1008, 1010, $R_1$ and $R_{11}$ represent resistance of the conductive surfaces 1006 and 1002, $R_3$, $R_6$, and $R_8$ represent resistance of the conductive surfaces 1014, 1022, and 1018, $R_2$, $R_5$, $R_7$, and $R_{10}$ represent the resistance of the heater body 1004 to current flowing through the thickness of the heater body 1004, that is, perpendicular to both the leads 1008, 1010 (Y direction) and the slots 1012, 1016, and 1020 (Y direction), or in a Z direction, and $R_4$, $R_9$, and $R_{13}$ represent resistance of the heater body 1004 to current flowing along the surfaces of heater body 1004, that is, perpendicular to the leads 1008, 1010 (Y direction), and perpendicular to the slots 1012, 1016, and 1020, or in an X direction.

In particular, during operation below the trip temperature, the current of the PPTC tank heater 1000 may flow between lead 1008 and lead 1010 by flowing mainly through lead 1008 ($R_0$) through the conductive surface 1006 ($R_1$); through the thickness of the heater body 1004 ($R_2$) (in the Z direction); along the surface of conductive surface 1014 ($R_3$) which is along the backside of the heater body (FIG. 10B); back through the thickness of the heater body 1004 ($R_5$), in the Z direction to the front of the device (FIG. 10A); along the surface of conductive surface 1022 ($R_6$); through the thickness of the heater body 1004 ($R_7$) in the Z direction to the back of the device (FIG. 10B); along the surface of conductive surface 1018 ($R_8$); through the thickness of the heater body 1004 ($R_{10}$) in the Z direction, again to the front of the device (FIG. 10A); and through the conductive surface 1002 ($R_{11}$) and lead 1010 ($R_{12}$). In other words, during operation below the trip temperature, the current does not jump in the Y direction across the slots 1012 or 1020 on the front side of the device, nor across the slot 1016 on the back side of the device.

Because the size of the slots 1016, 1012, 1020 may be much larger than the thickness of the heater body 1004, the current does not typically flow along the paths in the plane of the heater body (in the X direction) as indicated by resistances $R_4$, $R_9$, $R_{13}$. In some embodiments, the PPTC tank heaters 900 and 1000 provide the same power designs (N=3). The resistance of the given heater resistance is approximately the initial resistance multiplied by 16 ($R \approx 16 R_i$ when $R_2 = R_5 = R_7 = R_{10}$ and the PPTC tank heater is in a non-tripped state).

The principles of the above-described PPTC tank heaters may be extended to one-sided electrodes having many more slots. FIG. 11, for example, shows a PPTC tank heater 1100 with a one-sided electrode, 7-slot design, according to exemplary embodiments. Conductive surface 1106 is connected to lead 1108 and conductive surface 1102 is connected to lead 1110. The PPTC tank heater 1100 includes seven additional conductive surfaces, with conductive surfaces 1114, 1118, 1122, 1106, and 1102 being disposed on one side, and conductive surfaces 1126, 1130, 1134, and 1138 being disposed on the opposite side. Slots 1112, 1116, 1120, and 1124 are regions in which the heater body 1104 is exposed on one side of the PPTC tank heater 1100 while slots 1128, 1132, and 1136 expose the heater body on the opposite side.

Figure 12C:
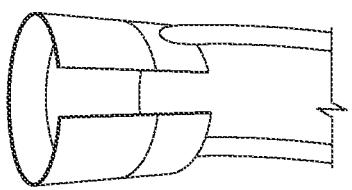
FIGS. 12A-12D are diagrams illustrating an annular PPTC tank heater, in accordance with exemplary embodiments.
Figure 12D:
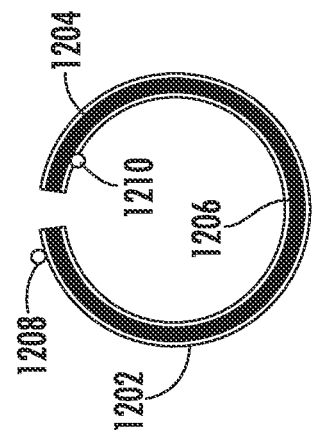
Figure 12A:
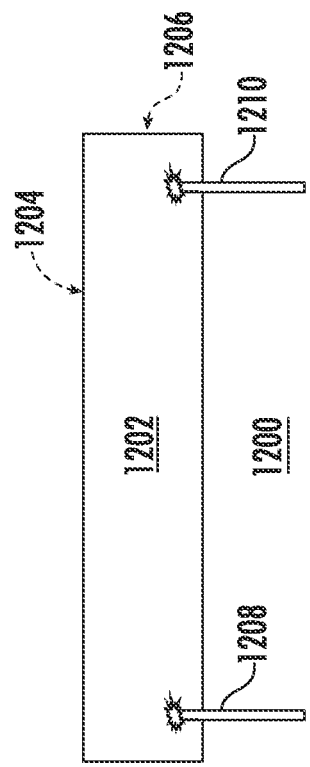
Figure 12B:
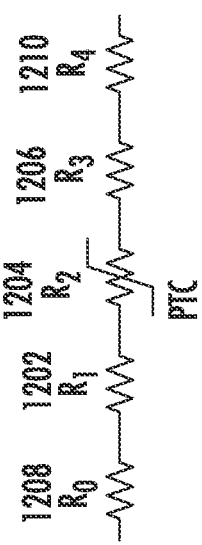

FIGS. 12A-12D are representative drawings associated with a PPTC tank heater 1200, according to exemplary embodiments. FIG. 12A shows a side plan view of the PPTC tank heater 1200, FIG. 12B is an equivalent circuit for the PPTC tank heater 1200, FIG. 12C is a photograph of the PPTC tank heater 1200, and FIG. 12D shows the PPTC tank heater 1200 in an annular shape. The PPTC tank heater 1200 includes a heater body 1204 (FIG. 12D) sandwiched between a conductive surface 1202 and a conductive surface 1206. A lead 1208 is disposed on one side of the PPTC tank heater 1200 (outside the annular surface in FIG. 12D) while a lead 1210 is disposed on the opposing side (inside the annular surface in FIG. 12D). In this example, the conductive surface 1202 is connected to the lead 1208, while the conductive surface 1206 is connected to the lead 1210. As such, current will pass through the thickness of the PPTC tank heater body in the Z direction. In the equivalent circuit of FIG. 12B, $R_0$ and $R_4$ represent the resistance of the lead 1208 and 1210, $R_1$ and $R_3$ represent resistance of the conductive surfaces 1202 and 1206 and $R_2$ represents the resistance of the heater body 1204 to current flowing through the thickness of the heater body.

Heater Body

FIGS. 13A-13D are side plan views of a heater body of a PPTC tank heater, in accordance with exemplary embodiments. Recall that the PPTC tank heaters disclosed herein include a heater body that consists of PPTC material, where the PPTC material consists of a polymer matrix consisting of 1) conductive phase material or conductive filler (such as carbon and/or graphene) and 2) a semi-crystalline polymer. As shown in FIG. 13A, the heater body 1304 consists of a PPTC polymer matrix 1302 consisting of conductive filler 1306 disposed within a polymer 1308, with the polymer matrix being sandwiched between two metal foils 1310. In an exemplary embodiment, the metal foils 1310 each include nodules (bumps) on the one side that interfaces with the PPTC polymer matrix 1302, which strengthens the connection between the foils and the matrix.

The heater body 1304 may be manufactured so that the PPTC tank heater containing the heater body has a pre-defined self-regulation temperature. In an exemplary embodiment, the self-regulation temperature is 125° C., but the PPTC tank heater and, specifically, the heater body containing the polymer matrix composed of conductive filler and polymer, may be designed to satisfy a wide variety of customer temperature preferences. Specifically, the type of conductive filler and polymer, as well as the percentage combination of each, may be adjusted to achieve a certain self-regulation temperature profile. Accordingly, there are many different materials that may be used to make up both the conductive filler 1306 and the polymer 1308 of the PPTC polymer matrix 1302.

FIGS. 13B-13D illustrate possible combinations of graphene and carbon that may make up the polymer matrix 1302, according to exemplary embodiments. The ratio of graphene to carbon may be 0:100, that is, no graphene and all carbon (FIG. 13B); the ratio of graphene to carbon may be 100:0, that is, all graphene and no carbon (FIG. 13C); or the ratio of graphene to carbon may range between 1:99 and 99:1, that is, any percentage combination of the two materials between 1 and 99% (FIG. 13D).

In exemplary embodiments, the polymer 1308 includes semi-crystalline polymers, e.g., polyethylene, polyvinylidene fluoride, ethylene tetrafluoroethylene, ethylene-vinyl acetate, ethylene and acrylic acid copolymer, ethylene butyl acrylate copolymer, poly-perfluoroalkoxy, or some combination of one or more of these materials. Further, in exemplary embodiments, the volume percentage of polymer 1308 to conductive filler 1306 in the PPTC polymer matrix 1302 is between 50% and 99%, preferably between 60% and 95%. Thus, for example, at one end of the spectrum, the polymer matrix may consist of 50% polymer and 50% conductive filler. At the other end of the spectrum, the polymer matrix may consist of 99% polymer and 1% conductive filler. Preferably, the polymer matrix may consist of 60% polymer and 40% conductive filler at one end, 95% polymer and 5% conductive filler at the other end, and there are many other combinations in between these preferences that may result in a preferred self-regulation temperature profile.

In exemplary embodiments, the conductive filler 1306 of the polymer matrix is made up of carbon, graphene, carbon and graphene, conductive ceramic, carbon nanotubes, carbon with carbon nanotubes, or graphene with carbon nanotubes. In exemplary embodiments, the conductive filler 1306 of the PPTC polymer matrix 1302 is made up of carbon having a primary particle size of between 10 nm and 100 nm and further with a di-butyl phthalate (DBP) value of between 5 $cm^3/100$ g and 500 $cm^3/100$ g. Preferably, the DBP value ranges from between 8 $cm^3/100$ g and 200 $cm^3/100$ g. Further, in exemplary embodiments, the graphene (carbon) loading is between 20% and 65%, preferably between 25% and 30%.

In exemplary embodiments, the conductive filler 1306 of the PPTC polymer matrix 1302 is made up of graphene, where the graphene is prepared by a mechanical or chemical method with the graphene layers numbering from one to several hundred, preferably between one and 30 layers. In an exemplary embodiment, the thickness of each graphene layer is less than 20 nm, preferably between 0.34 nm and 10.2 nm. Further, in exemplary embodiments, the graphene particle size ranges from between 0.1 μm and 100 μm, preferably between 5 μm and 30 μm. In exemplary embodiments, the graphene loading is between 1% and 50%, preferably between 4% and 30%.

In exemplary embodiments, the conductive filler 1306 of the PPTC polymer matrix 1302 is made up of carbon or conductive ceramic, where the carbon primary particle size is between 10 nm and 100 nm, with a DBP value of between 5 $cm^3/100$ g and 500 $cm^3/100$ g, preferably with a DBP value range from between 8 $cm^3/100$ g and 200 $cm^3/100$ g. The ratio of carbon or conductive ceramic to graphene may be between 0%/100% (no carbon/conductive ceramic, 100% graphene) and 100%/0% (100% carbon or conductive ceramic, no graphene), and anywhere in between. In a preferred embodiment, the ratio of carbon or conductive ceramic to graphene would be between 1% and 90%, preferably between 30% and 60%.

In exemplary embodiments, the conductive filler 1306 of the PPTC polymer matrix 1302 is made up of carbon nanotube (CNT) or graphene with carbon, with the carbon primary particle size being between 10 nm and 100 nm, with a DBP value of between 5 $cm^3/100$ g and 500 $cm^3/100$ g, preferably with a DBP value range from between 8 $cm^3/100$ g and 200 $cm^3/100$ g. In an exemplary embodiment, the nanotube length of the conductive filler 1306 is from between 10 nm and 10 μm, the diameter is between 2 nm and 50 nm, with the length/diameter of the CNT being between 5 and 5000, preferably between 100 and 1000. In an exemplary embodiment, the ratio of carbon to graphene or carbon to nanotube is between 1% and 90%, preferably between 30% and 60%.

Further, in exemplary embodiments, either the polymer 1308 or the conductive filler 1306, or both, of the PPTC polymer matrix 1302 are supplemented with materials including, but not limited to, antioxidants, dispersion agents, coupling agents, cross-linkers, arc suppressants, and so on. Thus, the heater body 1304 may be manufactured using a wide variety of materials, and the heater body of FIG. 13A may be part of any of the PPTC tank heaters disclosed and described herein.

Figure 14A:
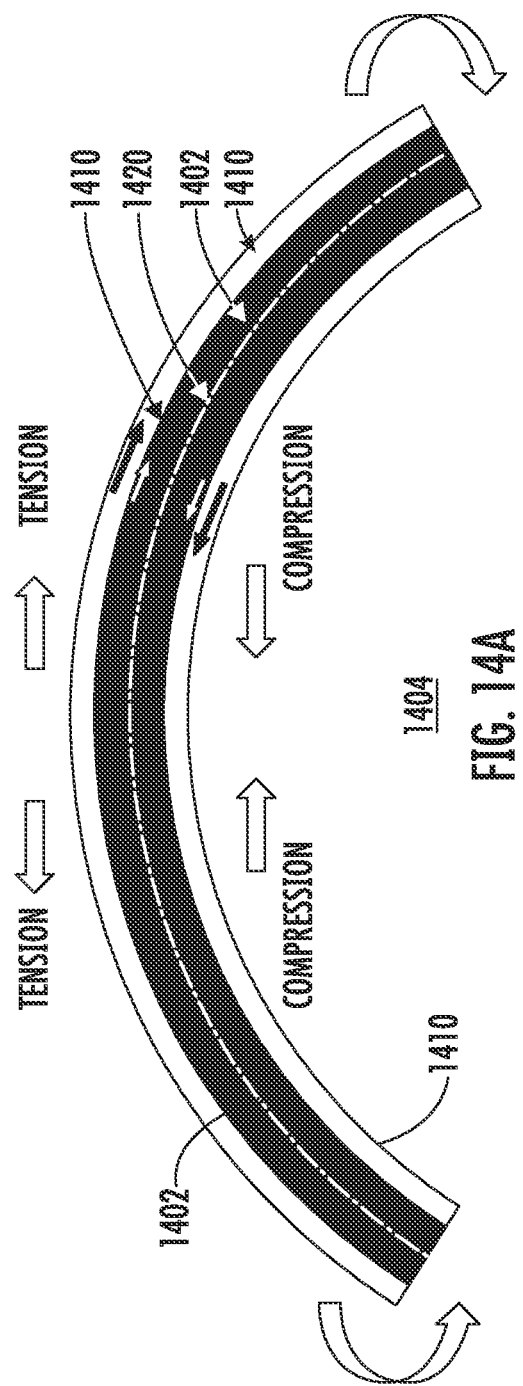
FIGS. 14A-14B are illustrations of the effects of bending the PPTC tank heater, in accordance with exemplary embodiments.
Figure 14B:
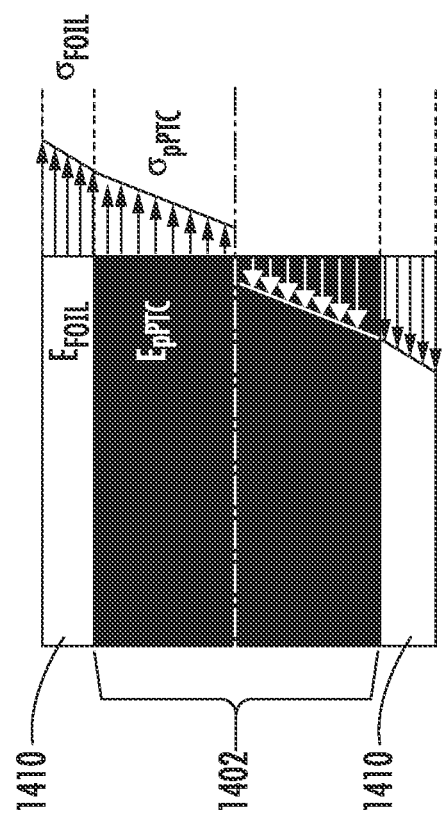

FIGS. 14A and 14B are representative diagrams illustrating effects of the bending process for the PPTC material of a PPTC tank heater, specifically the heater body that contains the PPTC polymer matrix, according to exemplary embodiments. A heater body 1404 of a PPTC tank heater (PPTC tank heater body 1404) consists of a PPTC polymer matrix 1402 with metal foil 1410 disposed on either side of the polymer matrix.

In an exemplary embodiment, based on its material composition, the PPTC polymer matrix 1402 is able to bend in an elastic-plastic range, that is, as if both elastic and plastic deformation occur, although the plastic deformation is very small. An imaginary neutral line 1420 shows that the PPTC polymer matrix 1402 is quite bendable. Recall that the metal foils 1410 may include nodules disposed on the side that is adjacent to the PPTC polymer matrix 1402, to improve a connection between the two interfaces. In some embodiments, the nodules of the metal foils 1410 are high enough to move in an elastic range during bending. Nevertheless, the bending causes a tension of the outside metal foil 1410 and half of the PPTC polymer matrix 1402 while, at the same time, a compression of the inside metal foil and another half of the PPTC polymer matrix 1402. Further, there is the imaginary neutral line 1420 between the half of the PPTC polymer matrix 1402 and another half of PPTC polymer matrix 1402.

Heating of the PPTC tank heater during the bending operation is not necessary. In one embodiment, some heat is applied to the PPTC tank heater during the bending operation. However, the heating temperature is maintained below the semi-crystalline polymer melt temperature. Otherwise, the properties of the conductive particles in the PPTC polymer matrix will change, possibly disrupting the manufacturing process of the PPTC tank heater. Once the heater body 1404 assumes the desired annular shape following bending, an annealing process may be employed to release the bending stress.

FIG. 14B is a diagram illustrating the stress and strain characteristics of the PPTC tank heater body 1404 of FIG. 14A, according to exemplary embodiments. The stress, given by $\sigma$, is shown for both the outside metal foil 1410 ($\sigma_{foil}$) and the PPTC polymer matrix 1402 ($\sigma_{pPTC}$). The modulus of elasticity, given by E, is also given for the outside metal foil 1410 ($E_{foil}$) and the PPTC polymer matrix 1402 ($E_{pPTC}$). From this information, the strain, $\varepsilon$, on each material may be calculated, using the formula, $\sigma = E\varepsilon$.

Figure 15:
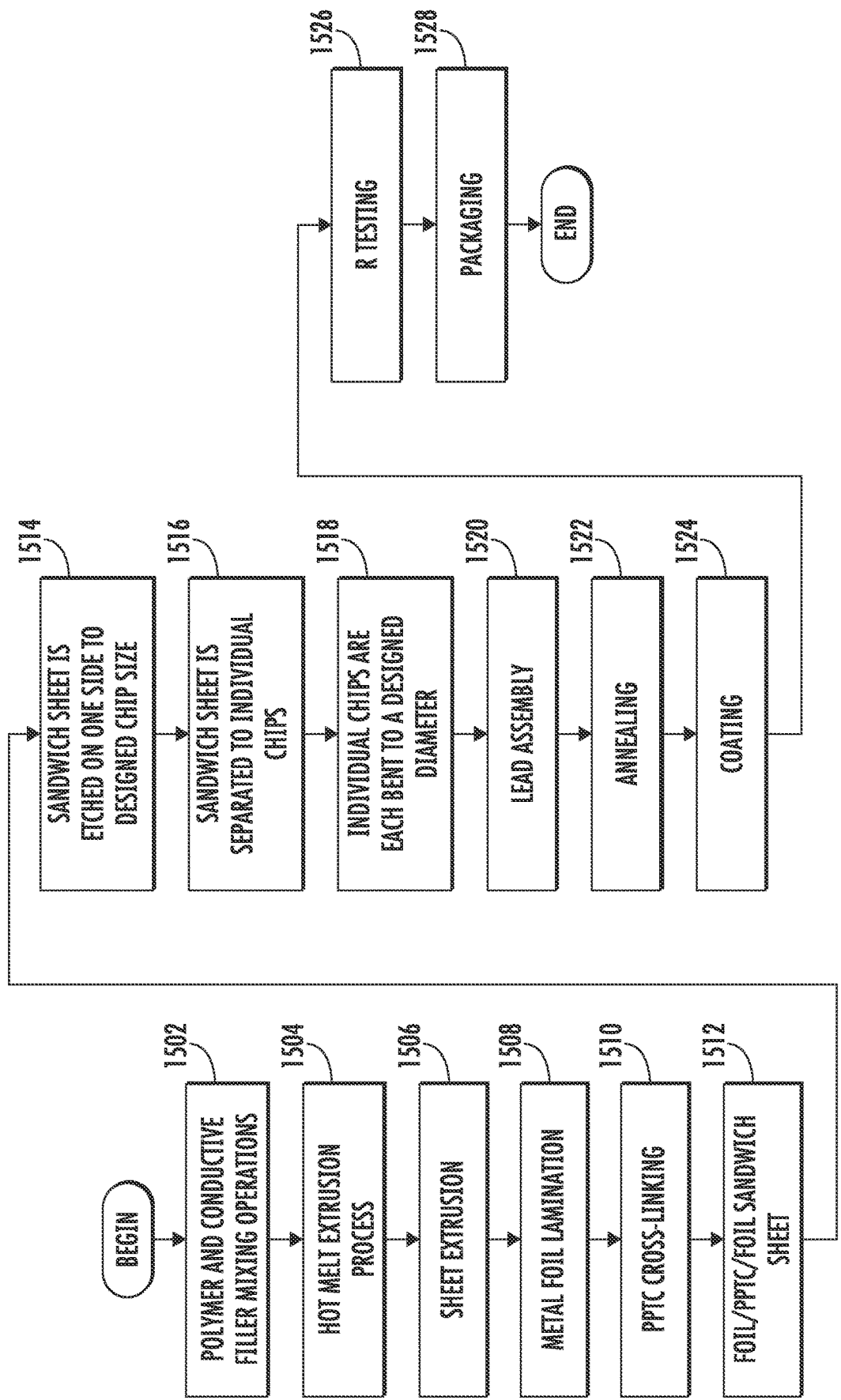
FIG. 15 is a flow diagram of the manufacture of a PPTC tank heater, in accordance with exemplary embodiments.

FIG. 15 is a flow diagram showing process steps for manufacturing a PPTC tank heater such as any of the disclosed PPTC tank heaters, according to exemplary embodiments. The manufacturing process commences with polymer and conductive filler mixing operations (block 1502), as these make up the polymer matrix described above. A hot melt extrusion process is then undertaken on the polymer matrix (block 1504). Hot melt extrusion (HME) is the process of applying heat and pressure to melt a polymer and force it through an orifice in a continuous process. This enables the polymer matrix to assume a predefined uniform shape and density. The polymer matrix is then extruded into sheets (block 1506). The extruded sheet of polymer matrix is then laminated on both sides with metal foil (block 1508), forming the sandwich of metal foil (electrodes and/or conductive regions) with the polymer matrix in between, as described in the aforementioned PPTC tank heaters.

Following the metal foil lamination, a PPTC cross-linking operation is performed on the polymer matrix (block 1510). In polymer chemistry, cross-linking employs cross-links to promote a change in the polymer's physical properties. Here, the polymer matrix is cross-linked so that a PPTC with desired properties emerges. In exemplary embodiments, the PPTC crosslinking is achieved by electron beaming, gamma irradiation, or chemical crosslinking. A foil-PPTC-foil sandwich sheet is then formed (block 1512). The sandwich sheet is then etched on one side (where N=1) or etched on both sides (if N≥3) to a designed chip size (block 1514). The sandwich sheet is then cut based on the etch into individual chips (block 1516), where each chip is a sandwich of metal foil-PPTC-metal foil, as desired for the PPTC tank heater.

Next, the individual chips are each bent to form annular shapes at a designated diameter (block 1518). Although the embodiments described herein have been ring-shaped so as to fit over a cylindrical inlet for a storage tank, the individual chips may alternatively be bent into other shapes suitable for the desired application. In exemplary embodiments, the shape of the PPTC tank heater is bent at this stage to conform to the shape of the device to be heated.

Following the bending of the chips to the desired shape, a lead assembly is performed in which the leads (e.g., leads 108 and 110 of FIG. 1A) are attached to the sandwiched chip (block 1520). An annealing process is then performed in which the sandwiched chip is heated and allowed to cool slowly in order to remove internal stresses and toughen the material. The sandwiched chip is then coated with a suitable material to protect the device or add other functions to the device (block 1522). For example, in one embodiment, a temperature-sensitive coating is added that causes the device to change colors at different temperatures (block 1524). R testing of the device is then performed (block 1526) and the device is packaged in a suitable packaging material (block 1528). The PPTC tank heater manufacturing process steps are thus complete.

One or more of the PPTC processing steps in FIG. 15 may be performed in an order other than is shown. Designers of ordinary skill in the art will recognize a number of ways in which these manufacturing operations may be performed.

As used herein, an element or step recited in the singular and proceeded with the word "a" or "an" should be understood as not excluding plural elements or steps, unless such exclusion is explicitly recited. Furthermore, references to "one embodiment" of the present disclosure are not intended to be interpreted as excluding the existence of additional embodiments that also incorporate the recited features.

While the present disclosure makes reference to certain embodiments, numerous modifications, alterations and changes to the described embodiments are possible without departing from the sphere and scope of the present disclosure, as defined in the appended claim(s). Accordingly, it is intended that the present disclosure not be limited to the described embodiments, but that it has the full scope defined by the language of the following claims, and equivalents thereof.

The invention claimed is:

1. A polymeric positive temperature coefficient (PPTC) tank heater comprising:
 a first conductive region comprising:
  a first conductive surface coupled to a first lead;
  a second conductive surface coupled to a second lead;
  a third conductive surface disposed between the first conductive surface and the second conductive surface;
  a first slot disposed between the first conductive surface and the third conductive surface; and
  a second slot disposed between the third conductive surface and the second conductive surface;
 a heater body comprising a PPTC polymer matrix, the PPTC polymer matrix comprising a conductive filler and a semi-crystalline polymer; and
 a second conductive region comprising:
  a fourth conductive surface;
  a fifth conductive surface; and
  a third slot disposed between the fourth conductive surface and the fifth conductive surface, wherein the heater body is disposed between the first conductive region and the second conductive region to form a sandwich;
 wherein the sandwich comprises a plurality of heating elements coupled in series, each heating element of the plurality of heating elements comprising a different resistance, the plurality of heating elements further comprising:
  a first heating element comprising the first conductive surface, the heater body, and the fourth conductive surface;
  a second heating element comprising the fourth conductive surface, the heater body, and the third conductive surface;

a third heating element comprising the third conductive surface, the heater body, and the fifth conductive surface; and a fourth heating element comprising the fifth conductive surface, the heater body, and the second conductive surface.

2. The PPTC tank heater of claim 1, wherein the first heating element is coupled to the second heating element, the second heating element is coupled to the third heating element, and the third heating element is coupled to the fourth heating element.

3. The PPTC tank heater of claim 2, wherein the fourth heating element increases in temperature faster than the first heating element, the second heating element, and the third heating element.

4. The PPTC tank heater of claim 2, wherein the first heating element increases in temperature slower than the second heating element, the third heating element, and the fourth heating element.

5. A polymeric positive temperature coefficient (PPTC) tank heater comprising:
   a heater body comprising a PPTC polymer matrix, the PPTC polymer matrix comprising a conductive filler and a semi-crystalline polymer;
   a first heating element comprising the heater body disposed between a first conductive surface and a second conductive surface, wherein the first conductive surface is coupled to a first lead; a second heating element comprising the heater body disposed between the second conductive surface and a third conductive surface;
   a third heating element comprising the heater body disposed between the third conductive surface and a fourth conductive surface; and
   a fourth heating element comprising the heater body disposed between the fourth conductive surface and a fifth conductive surface, wherein the fifth conductive surface is coupled to a second lead;
   wherein the first heating element, the second heating element, the third heating element, and the fourth heating element are coupled in series.

6. The PPTC tank heater of claim 5, the first heating element comprising a first resistance, the second heating element comprising a second resistance, the third heating element comprising a third resistance, and the fourth heating element comprising a fourth resistance, wherein the first resistance is unequal to the second resistance, the second resistance is unequal to the third resistance, the third resistance is unequal to the fourth resistance, and the fourth resistance is unequal to the first resistance.

7. The PPTC tank heater of claim 6, wherein the first conductive surface has a first height and the second conductive surface has a second height, wherein the second height is greater than the first height.

8. The PPTC tank heater of claim 7, wherein the third conductive surface has a third height and the fourth conductive surface has a fourth height wherein the third height is greater than the fourth height.

9. The PPTC tank heater of claim 8, wherein the fifth conductive surface has a fifth height, and the fifth height is smaller than the first height, second height, the third height, and the fourth height.

10. The PPTC tank heater of claim 5, wherein the first conductive surface, the second conductive surface, the third conductive surface, the fourth conductive surface, and the fifth conductive surface have the same width and thickness.

11. The PPTC tank heater of claim 5, wherein the first conductive surface, the third conductive surface, and the fifth conductive surface are part of a first conductive region comprising a first slot and a second slot, wherein the first slot is disposed between the first conductive surface and the third conductive surface, and the second slot is disposed between the third conductive surface and the fifth conductive surface.

12. The PPTC tank heater of claim 11, wherein the second conductive surface and the fourth conductive surface are part of a second conductive region comprising a third slot, wherein the third slot is disposed between the second conductive surface and the fourth conductive surface.

13. The PPTC tank heater of claim 12, wherein the heater body is sandwiched between the first conductive region and the second conductive region.

14. A polymeric positive temperature coefficient (PPTC) tank heater comprising:
   a heater body comprising a PPTC polymer matrix, the PPTC polymer matrix comprising a conductive filler and a semi-crystalline polymer;
   a first conductive region comprising N conductive surfaces and N-1 slots, for integer N; and
   a second conductive region comprising M conductive surfaces and M-1 slots, for integer M, each of the N conductive surfaces and the M conductive surfaces having the same width, the same thickness, and different height, wherein the heater body is sandwiched between the first conductive surface and the second conductive surface;
   wherein a plurality of heating elements is formed, each heating element of the plurality of heating elements comprising a first conductive surface from the N conductive surfaces and a second conductive surface from the M conductive surfaces, with the heater body sandwiched between the first and second conductive surfaces.

15. The PPTC tank heater of claim 14, wherein the conductive filler is selected from a group consisting of carbon, graphene, carbon and graphene, conductive ceramic, carbon nanotubes, carbon with carbon nanotubes, and graphene with carbon nanotubes.

16. The PPTC tank heater of claim 14, wherein the semi-crystalline polymer is selected from a group consisting of polyethylene, polyvinylidene fluoride, ethylene tetrafluoroethylene, ethylene-vinyl acetate, ethylene and acrylic acid copolymer, ethylene butyl acrylate copolymer, and polyperfluoroalkoxy.

* * * * *